(12) United States Patent
Goto et al.

(10) Patent No.: US 10,948,570 B2
(45) Date of Patent: Mar. 16, 2021

(54) SIGNAL PROCESSOR AND RADAR APPARATUS

(71) Applicant: FURUNO ELECTRIC CO., LTD., Nishinomiya (JP)

(72) Inventors: Keisuke Goto, Nishinomiya (JP); Hitoshi Maeno, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 662 days.

(21) Appl. No.: 15/569,170

(22) PCT Filed: Mar. 9, 2016

(86) PCT No.: PCT/JP2016/057283
§ 371 (c)(1),
(2) Date: Oct. 25, 2017

(87) PCT Pub. No.: WO2016/174929
PCT Pub. Date: Nov. 3, 2016

(65) Prior Publication Data
US 2018/0149731 A1    May 31, 2018

(30) Foreign Application Priority Data
Apr. 28, 2015  (JP) .............................. JP2015-091989

(51) Int. Cl.
*G01S 7/41*      (2006.01)
*G01S 13/937*    (2020.01)

(52) U.S. Cl.
CPC ............ *G01S 7/412* (2013.01); *G01S 13/937* (2020.01)

(58) Field of Classification Search
CPC .. G01S 7/41–412; G01S 13/937; G01S 7/539; G01S 7/4802
See application file for complete search history.

(56) References Cited

U.S. PATENT DOCUMENTS

| | | | |
|---|---|---|---|
| 4,470,048 A | | 9/1984 | Short, III |
| 4,992,797 A | * | 2/1991 | Gjessing ................. G01S 13/04 342/192 |

(Continued)

FOREIGN PATENT DOCUMENTS

| | | |
|---|---|---|
| CN | 102062854 A | 5/2011 |
| GB | 2475395 A | 5/2011 |

(Continued)

OTHER PUBLICATIONS

International Search Report issued in PCT/JP2016/057283; dated Jun. 14, 2016.

(Continued)

*Primary Examiner* — Matthew M Barker
(74) *Attorney, Agent, or Firm* — Studebaker & Brackett PC

(57) ABSTRACT

In order to accurately identify a target object, a signal processor is provided, which includes an extracting module configured to extract, from echo sample sequences, a plurality of samples caused by the target object as a partial sample sequence, a characteristic amount calculating module configured to calculate a characteristic of the partial sample sequence as a characteristic amount, a memory configured to store a plurality of type-based data that are data as comparison targets of the characteristic amount and correspond to types from which the target object is identified, and an identifying module configured to compare the characteristic amount with each of the plurality of type-based data and, based on the comparison result, identify the target object corresponding to the partial sample sequence for which the characteristic amount is calculated.

13 Claims, 21 Drawing Sheets

(56) References Cited

U.S. PATENT DOCUMENTS

| | | | | |
|---|---|---|---|---|
| 5,012,252 | A * | 4/1991 | Faulkner | G01S 7/2923 |
| | | | | 342/192 |
| 6,337,654 | B1 * | 1/2002 | Richardson | G01S 7/412 |
| | | | | 342/90 |
| 6,437,728 | B1 * | 8/2002 | Richardson | G01S 7/412 |
| | | | | 342/90 |
| 7,289,060 | B1 | 10/2007 | Abatzoglou et al. | |
| 7,840,075 | B2 * | 11/2010 | Vacanti | G01S 13/86 |
| | | | | 382/218 |
| 8,063,815 | B2 * | 11/2011 | Valo | G01S 7/412 |
| | | | | 342/25 R |
| 8,866,666 | B2 * | 10/2014 | Nakahama | G01S 7/295 |
| | | | | 342/90 |
| 2011/0109492 | A1 | 5/2011 | Nakahama | |
| 2012/0286989 | A1 | 11/2012 | Sathyendra et al. | |
| 2014/0210659 | A1 | 7/2014 | Nakahama | |

FOREIGN PATENT DOCUMENTS

| | | | |
|---|---|---|---|
| JP | 2001-159678 | A | 6/2001 |
| JP | 2002-090446 | A | 3/2002 |
| JP | 2002-131419 | A | 5/2002 |
| JP | 2002-221567 | A | 8/2002 |
| JP | 2002-341022 | A | 11/2002 |
| JP | 2002-357657 | A | 12/2002 |
| JP | 2003-035769 | A | 2/2003 |
| JP | 2005-140687 | A | 6/2005 |
| JP | 2005-214723 | A | 8/2005 |
| JP | 2005-337854 | A | 12/2005 |
| JP | 2006-242632 | A | 9/2006 |
| JP | 2008-256409 | A | 10/2008 |
| JP | 2010-038744 | A | 2/2010 |
| JP | 2011-099836 | A | 5/2011 |
| JP | 2011-158409 | A | 8/2011 |
| JP | 2013-174473 | A | 9/2013 |
| WO | 2006/025453 | A1 | 3/2006 |

OTHER PUBLICATIONS

An Office Action; "Notification of Reasons for Refusal," issued by the Japanese Patent Office on Apr. 2, 2019, which corresponds to Japanese Patent Application No. 2017-515420 and is related to U.S. Appl. No. 15/569,170; with English Translation.

Murali M. Menon et al., "An Automatic Ship Classification System for ISAR Imagery", Proceedings of SPIE, vol. 2492, Apr. 6, 1995 (Apr. 6, 1995). XP055206600, ISSN: 0277-786X, DOI: 10.1117/12.205142, pp. 289-308

The extended European search report issued by the European Patent Office dated Nov. 20, 2018, which corresponds to European Patent Application No. 16786206.9-1206 and is related to U.S. Appl. No. 15/569,170.

* cited by examiner $CV = (C1, C2, C3, C4)$

HIGH-DETERIORATION DEGREE TEMPLATE GROUP

MEDIUM-DETERIORATION DEGREE TEMPLATE GROUP

LOW-DETERIORATION DEGREE TEMPLATE GROUP

SIGNAL PROCESSOR AND RADAR APPARATUS

CROSS REFERENCE TO RELATED APPLICATIONS

This application is a U.S. National stage of International Application No. PCT/JP2016/057283 filed on Mar. 9, 2016. This application claims priority to Japanese Patent Application No. 2015-091989 filed on Apr. 28, 2015. The entire disclosure of Japanese Patent Application No. 2015-091989 is hereby incorporated herein by reference.

TECHNICAL FIELD

The present disclosure relates to a signal processor which detects a target object from echo signals, and to a radar apparatus which includes the signal processor.

BACKGROUND

As one example of conventional signal processors, JP2005-214723A discloses a target identifying device which uses chronological information of amplitudes of echo signals as it is to identify an object echo extracted from input signals. Particularly in this target identifying device, an identifying module receives a radar parameter and a distance-based partial waveform sequence from a reception waveform processing module, searches for and acquires a stored model parameter set, calculates a probability of outputting the distance-based partial waveform sequence according to each model parameter, and presents, as an identification result, a type of target which is included in a model calculation parameter corresponding to the model parameter with which a highest output probability is obtained. Thus, a target wave and an unnecessary wave are identified based on waveform.

SUMMARY

However, in JP2005-214723A, a probability model expressing a transition of an amplitude is required, and a problem of erroneously identifying the target when a transition with a low output probability in a stored probability model is observed occurs.

The present disclosure is to solve the above problem and aims to accurately identify a target object.

(1) In order to solve the problem described above, according to one aspect of the present disclosure, a signal processor for detecting a target object by using a transducer for transmitting a transmission wave and receiving a reflection wave of the transmission wave, based on a reception signal obtained from the reflection wave, may be provided. The signal processor may include an extracting module, a characteristic amount calculating module, a memory, and an identifying module. The extracting module may extract, from echo sample sequences each of which is obtained by plotting a plurality of samples constituting the reception signal on coordinates defined by a distance from the transducer and amplitudes of the plurality of samples and is generated for each azimuth with reference to a position of the transducer, a plurality of samples caused by the target object as a partial sample sequence. The characteristic amount calculating module may calculate a characteristic of the partial sample sequence as a characteristic amount. The memory may store a plurality of type-based data that are data as comparison targets of the characteristic amount and correspond to types from which the target object is identified. The identifying module may compare the characteristic amount with each of the plurality of type-based data and, based on the comparison result, identify the type of the target object for which the characteristic amount is calculated.

(2) The characteristic amount calculating module may calculate the plurality of characteristic amounts and generate a characteristic vector from the plurality of characteristic amounts.

(3) The characteristic amount may be one of the number of samples constituting a rising portion of the partial sample sequence, the number of samples constituting a falling portion of the partial sample sequence, a highest value of the amplitudes of the samples included in the partial sample sequence, and a value obtained based on an integral value of the falling portion.

(4) The identifying module may identify the target object based on similarity between the characteristic amount and the type-based data.

(5) The similarity may be calculated based on a difference between the characteristic amount and the type-based data.

(6) The type may correspond to the size of the target object.

(7) The memory may further store unnecessary object identification data as data that is a comparison target of the characteristic amount. The identifying module may compare the characteristic amount with the unnecessary object identification data and identify, based on the comparison result, that the partial sample sequence for which the characteristic amount is calculated is not caused by the target object.

(8) The signal processor may further include a deterioration degree estimating module configured to estimate a deterioration degree that is a degree of deterioration of the partial sample sequence, the memory storing the plurality of type-based data classified for each deterioration degree, as type-based data groups for each deterioration degree, and a data group selecting module configured to select, based on the deterioration degree estimated by the deterioration degree estimating module, a type-based data group for each deterioration degree to be compared with the partial sample sequence of which the deterioration degree is estimated. The identifying module may compare the characteristic amount with each of the plurality of type-based data constituting the type-based data group for each deterioration degree selected by the data group selecting module.

Echoes caused by other objects (rain, sea clutter, etc.) may be superimposed on the echo caused by the target object, which may cause distortion of the echo of the target object desired to be observed. The deterioration degree herein may be an index indicating the degree of difference of a partial sample sequence actually extracted (a partial sample sequence superimposed by the echoes of the other objects such as rain), from the partial sample sequence corresponding to only the target object.

(9) The plurality of types from which the target object is identified may include at least a large object and a small object indicating the size of the target object. When a position of a certain one of the partial sample sequences that is identified to be the small object and a position of another one of the partial sample sequences that is identified to be the small object have at least a given distance from each other, the identifying module may identify that the certain partial sample sequence is not caused by the target object.

(10) The plurality of types from which the target object is identified may be determined in advance according to the size of the target object. When a close-side partial sample sequence and a far-side partial sample sequence that are at least two partial sample sequences are extracted from the echo sample sequences, and the size of the target object indicated by the type of the far-side partial sample sequence that has a longer distance than the close-side partial sample sequence from the transducer is smaller than the size of the target object indicated by the type of the close-side partial sample sequence, the identifying module may identify that the far-side partial sample sequence is not caused by the target object.

(11) In order to solve the problem described above, according to one aspect of the present disclosure, a radar apparatus may include a transducer configured to transmit a transmission wave and receive a reflection wave of the transmission wave, any one of the described signal processors, and a display unit configured to display the identification result of the signal processor.

(12) The radar apparatus, which may be equipped on a ship, may further include a positioning unit configured to perform positioning of the ship, and a buoy information acquirer configured to store nautical chart information including positions of buoys and acquire positional information of a buoy within a given distance range from the ship among the buoys in the nautical chart information. The identifying module may identify that the target object is the buoy based on the positional information of the buoy acquired by the buoy information acquirer and positional information of the target object for which the partial sample sequence extracted by the extracting module of the signal processor is generated.

(12) The radar apparatus, which may be equipped on a ship, may further include a positioning unit configured to perform positioning of the ship, and a buoy information acquirer configured to store nautical chart information including positions of buoys and acquire positional information of a buoy within a given distance range from the ship among the buoys in the nautical chart information. The identifying module may identify that the target object is the buoy based on the positional information of the buoy acquired by the buoy information acquirer and positional information of the target object for which the partial sample sequence extracted by the extracting module of the signal processor is generated.

According to the present disclosure, the target object may accurately be identified.

DETAILED DESCRIPTION

Hereinafter, one embodiment of a radar apparatus 1 including an echo identification processor 10 as a signal processor according to the present disclosure is described with reference to the accompanying drawings. The present disclosure is broadly applicable as a signal processor which detects a target object from an echo signal, and a radar apparatus including the signal processor.

Figure 1:
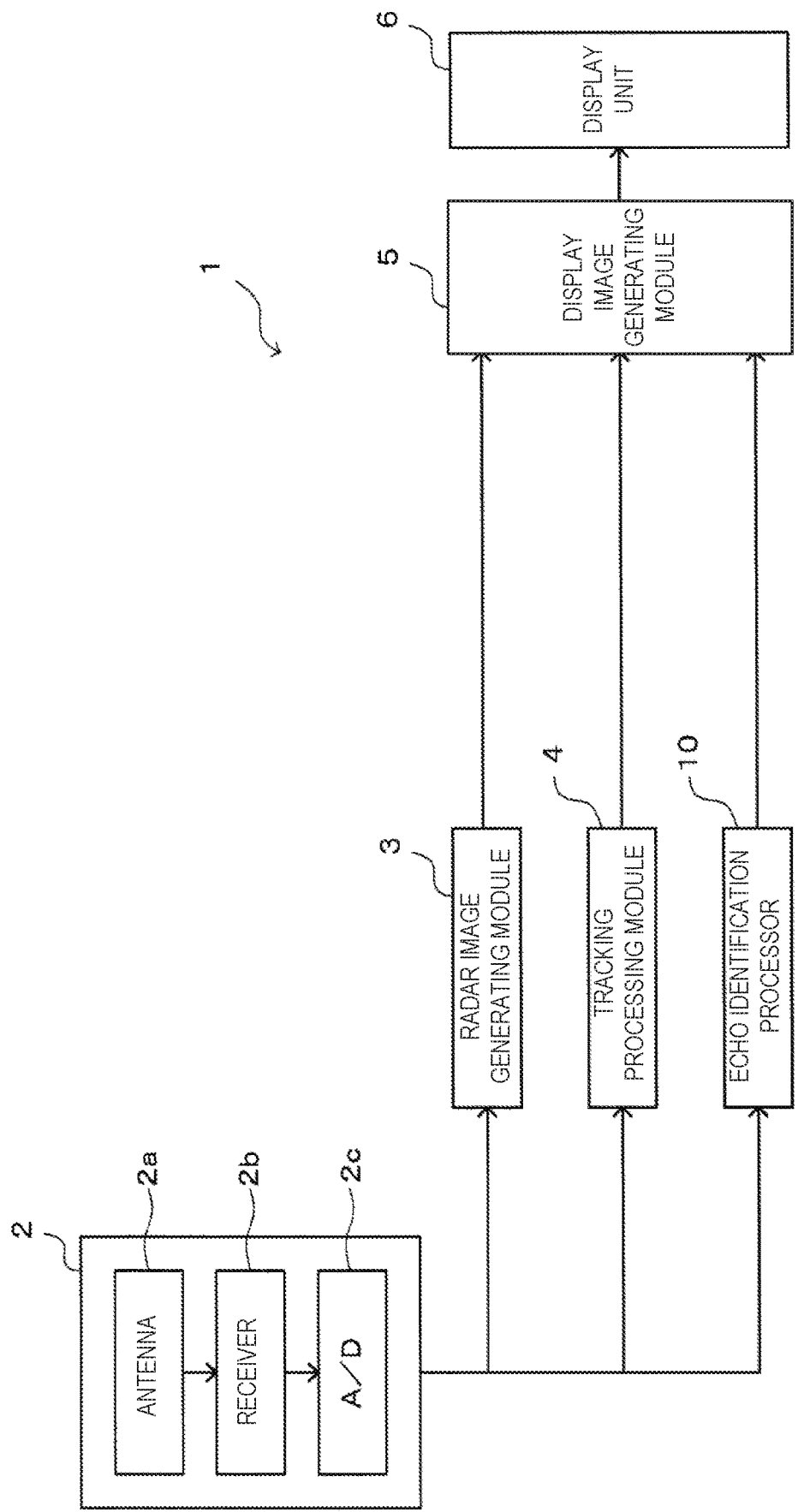
FIG. 1 is a block diagram of a radar apparatus according to one embodiment of the present disclosure.
Figure 2:
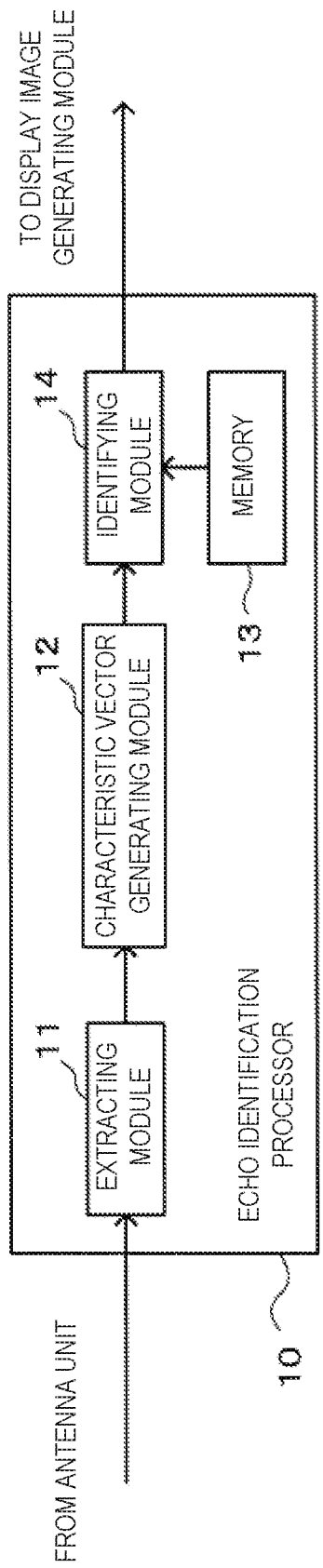
FIG. 2 is a block diagram of an echo identification processor illustrated in FIG. 1.

FIG. 1 is a block diagram of the radar apparatus 1 according to this embodiment of the present disclosure. Further, FIG. 2 is a block diagram of the echo identification processor 10 illustrated in FIG. 1. The radar apparatus 1 of this embodiment may be, for example, a ship radar and mainly used to detect objects, such as other ships. Further, the radar apparatus 1 may be configured to be capable of tracking an object selected as a tracked object. Note that in the following description, a ship equipped with the radar apparatus 1 may be referred to as "the ship."

As illustrated in FIG. 1, the radar apparatus 1 may include an antenna unit 2, a radar image generating module 3, a tracking processing module 4, the echo identification processor 10, a display image generating module 5, and a display unit 6.

The antenna unit 2 may include an antenna 2a, a receiver 2b, and an A/D converter 2c.

The antenna 2a may be a radar antenna capable of transmitting a pulsed radio wave (transmission wave) having high directivity. The antenna 2a may also be configured to receive a reflection wave from an object. The radar apparatus 1 may measure a time length from a transmission of the pulsed radio wave to a reception of the reflection wave. As a result, the radar apparatus 1 may detect a distance to the object. The antenna 2a may be configured to be capable of rotating 360° on a horizontal plane. The antenna 2a may be configured to repeatedly transmit and receive the radio wave at every given timing while changing the transmission direction of the pulsed radio wave (while changing the antenna angle). With the above configuration, the radar apparatus 1 may detect the object on a plane around the ship over 360°.

Note that, in the following description, an operation starting from a transmission of the pulse-shaped radio wave to the next transmission of the pulse-shaped radio wave may be referred to as "one sweep." Moreover, an operation of rotating the antenna 360° while performing the transmission and reception of the radio wave may be referred to as "one scan."

The receiver 2b may detect and amplify an echo signal obtained from the reflection wave received by the antenna 2a. The receiver 2b may output the amplified echo signal to the A/D converter 2c. The A/D converter 2c may sample the echo signal in analog and convert it into digital data (echo data) composed of a plurality of bits. Here, the echo data may include data specifying the intensity (signal level) of the echo signal obtained from the reflection wave received by the antenna 2a. The A/D converter 2c may output the echo data to the radar image generating module 3, the tracking processing module 4, and the echo identification processor 10.

Figure 3:
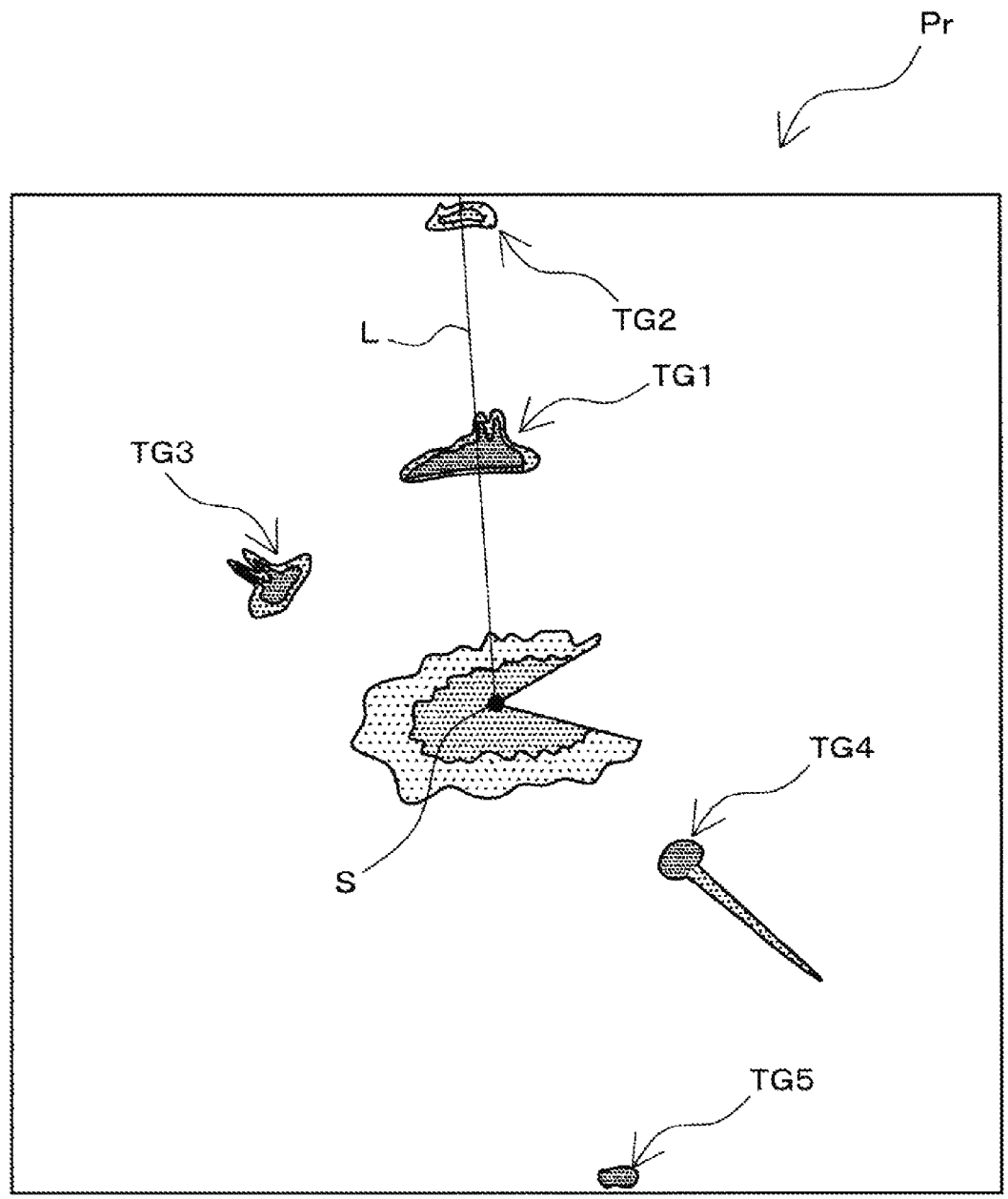
FIG. 3 is a view schematically illustrating one example of a radar image generated by a radar image generating module illustrated in FIG. 1.

FIG. 3 is a view schematically illustrating one example of a radar image Pr generated by the radar image generating module 3. Based on the echo data outputted from the A/D converter 2c, the radar image generating module 3 may generate the radar image Pr over 360° in the horizontal plane around a ship position S. The radar image Pr generated by the radar image generating module 3 may be outputted to the display image generating module 5. In the example illustrated in FIG. 3, five echo images TGn of target objects ("n" is a natural number and assigned corresponding to each target object) may be displayed on a display screen. Note that, the density of dots in FIG. 3 may correspond to the echo intensity of the reflection wave from the object. For example, an area where echoes with high intensity are observed may be illustrated with high density dots, and an area where echoes with low intensity are observed may be illustrated with low density dots. Echoes displayed in a center section of the display screen may be reflection waves from a sea surface (a sea clutter) near the ship position S.

The tracking processing module 4 may be configured to specify a tracked object (target object) based on the echo data outputted from the A/D converter 2c and perform tracking processing in which the tracked object is tracked. For example, the tracking processing module 4 may calculate coordinates and estimated velocity vector of the tracked object based on a velocity vector estimated from coordinates of the tracked object in the previous scanning. The tracking processing module 4 may output the calculated coordinates and estimated velocity vector of the tracked object to the display image generating module 5. Note that, detailed explanation of the processing performed by the tracking processing module 4 is omitted since it may be similar to the processing performed by a conventionally known tracking processor.

The echo identification processor 10 may extract the target object based on the echo data outputted from the receiver 2b, identify which type of object the target object is (e.g., a large ship, a medium ship, or a small ship), and output the identification result to the display image generating module 5. As illustrated in FIG. 2, the echo identification processor 10 may include an extracting module 11, a characteristic vector generating module 12, a memory 13, and an identifying module 14.

Figure 4:
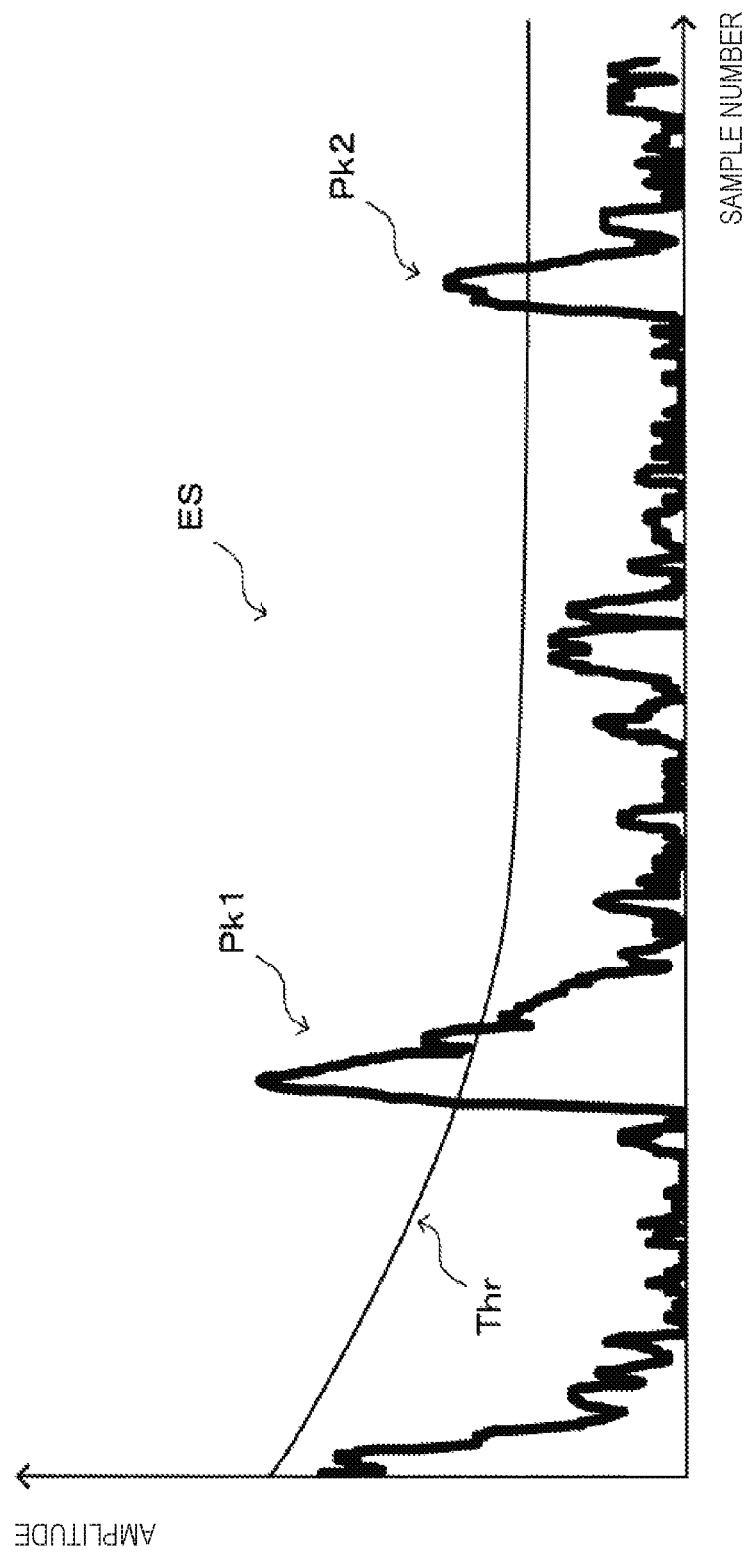
FIG. 4 is a graph illustrating one example of an echo sample sequence.
Figure 5:
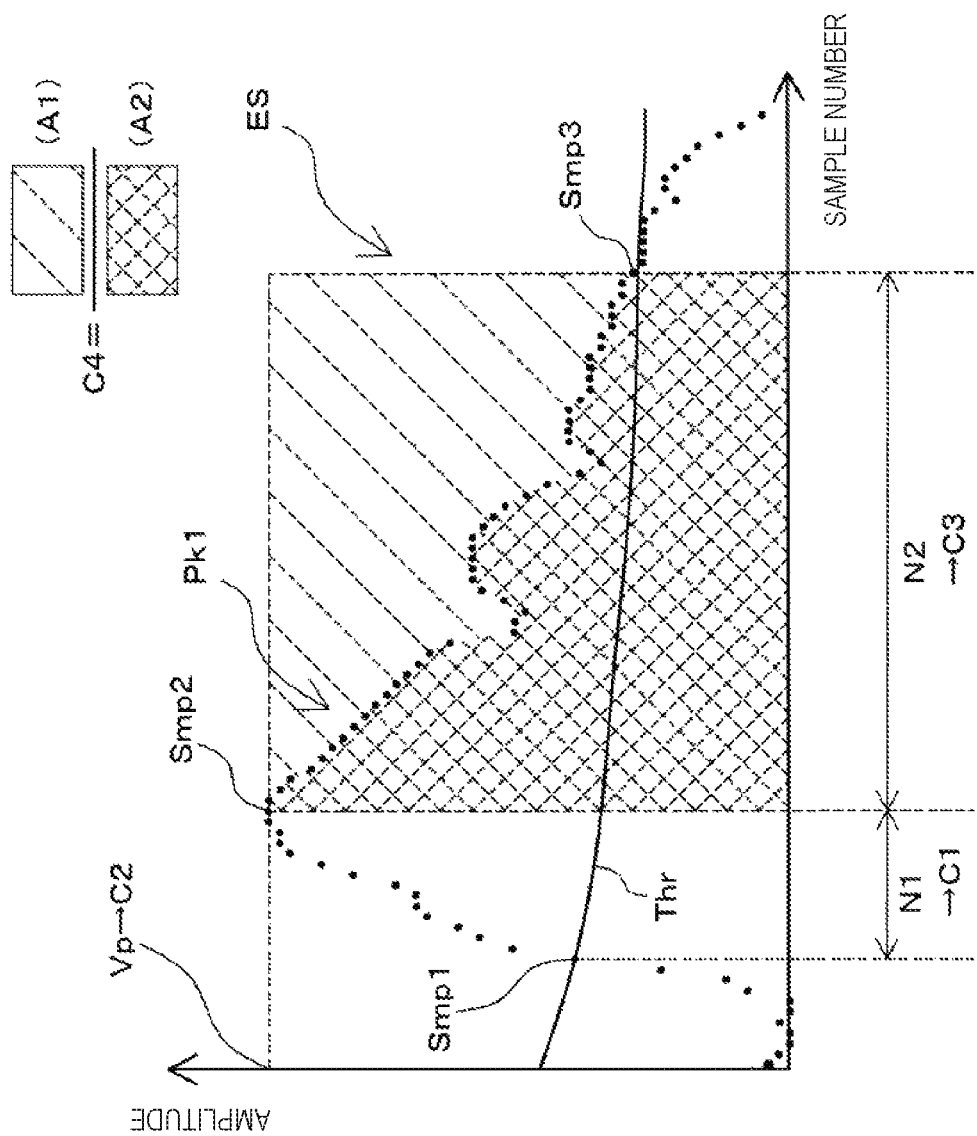
FIG. 5 is an enlarged view around a peak waveform Pk1 of the echo sample sequence illustrated in FIG. 4, illustrating a generating method of a characteristic vector.

FIG. 4 is a graph illustrating one example of an echo sample sequence ES. Further, FIG. 5 is an enlarged view around a peak waveform Pk1 of the echo sample sequence ES illustrated in FIG. 4. The echo sample sequence ES may be a graph obtained by plotting on coordinates a plurality of samples which are obtained from a single sweep. In the coordinates, as illustrated in FIGS. 4 and 5, the horizontal axis is a sample number (corresponding to the distance from the ship position S) and the vertical axis indicates the amplitude of the echo. The extracting module 11 may generate the echo sample sequence ES for every sweep. Note that, the echo sample sequence ES illustrated in FIG. 4 may be generated based on the reflection waves of the transmission waves transmitted in the direction of a straight line L in FIG. 3.

With reference to FIG. 5, the extracting module 11 may extract a portion of the echo sample sequence ES which is caused by the target object, as a partial sample sequence Rn (Smp1, . . . , Smp2, . . . , Smp3). For example, with reference to FIG. 4, the extracting module 11 may compare each of the sample data constituting the echo sample sequence with a threshold Thr stored in the extracting module 11 itself, and if at least a given number of successive sample data exceed the threshold Thr in a distance direction, the extracting module 11 may extract these sample data (Smp1, . . . , Smp2, . . . , Smp3 in the example illustrated in FIG. 5) as the partial sample sequence Rn. The partial sample sequence Rn thus extracted may be outputted to the characteristic vector generating module 12. Note that, in the example illustrated in FIG. 4, two partial sample sequences R1 and R2 corresponding to the two peak waveforms Pk1 and Pk2 are extracted, respectively.

With reference to FIG. 5, the characteristic vector generating module 12 may calculate a plurality of characteristic amounts for each partial sample sequence Rn, and generate a characteristic vector from the plurality of calculated characteristic amounts. In order to generate the characteristic vector, the characteristic vector generating module 12 may first calculate first to fourth characteristic amounts C1 to C4.

With reference to FIG. 5, the first characteristic amount C1 may be calculated based on the number N1 of samples in a rising portion of the peak waveform Pk1 (i.e., the number of successive samples from the sample Smp1 which exceeds the threshold Thr to the sample Smp2 which has a peak value Vp). In this embodiment, the first characteristic amount C1 may be calculated as a normalized value so that the number N1 of the samples falls within a range of 0 to 5.

The second characteristic amount C2 may be calculated based on the peak value Vp of the peak waveform Pk1. In this embodiment, the second characteristic amount C2 may be calculated as a normalized value so that the peak value Vp falls within the range of 0 to 5.

The third characteristic amount C3 may be calculated based on the number N2 of samples in a falling portion of the peak waveform Pk1 (i.e., the number of successive samples from the sample Smp2 which has the peak value Vp to the sample Smp3 which falls below the threshold Thr). In this embodiment, the third characteristic amount C3 may be calculated as a normalized value so that the number of samples falls within the range of 0 to 5.

The fourth characteristic amount C4 may be calculated based on a value obtained through dividing a value A1 by a value A2 (A1/A2). The value A1 may be obtained by integrating values obtained through reducing the peak value Vp by the respective amplitudes of the successive samples from the sample Smp2 which has the peak value Vp to the sample Smp3 which falls below the threshold Thr. The value A2 may be obtained through integrating the amplitudes of the successive samples from the sample Smp2 to the sample Smp3. That is, the fourth characteristic amount may be calculated based on the value (A1/A2) obtained through dividing the area of the hatched portion in FIG. 5 by the area of the cross-hatched portion. In this embodiment, the fourth characteristic amount C4 may be calculated as a normalized value so that the value of A1/A2 falls within the range of 0 to 5.

Figure 6:
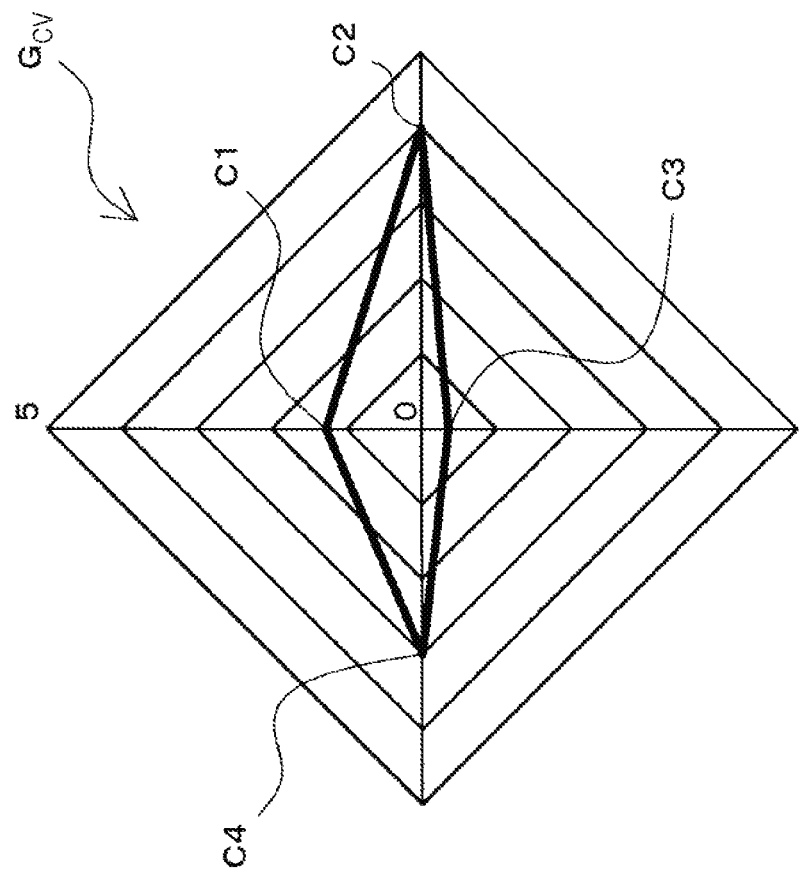
FIG. 6 is a view illustrating a characteristic vector and a characteristic vector graph generated from the characteristic vector.

FIG. 6 is a view illustrating a characteristic vector CV and a characteristic vector graph $G_{CV}$ generated from the characteristic vector CV. The characteristic vector generating module 12 may generate the characteristic vector CV by grouping the first to fourth characteristic amounts C1 to C4 calculated corresponding to each partial sample sequence Rn as one set. Then, the characteristic vector generating module 12 may generate the characteristic vector graph $G_{CV}$ as illustrated in FIG. 6 from the characteristic vector CV. The characteristic vector graph $G_{CV}$ may be a graph generated by plotting the characteristic amounts C1 to C4 on the axes of orthogonal coordinates and connecting the characteristic amounts C1 to C4 adjacent to each other in the circumferential direction with straight lines.

Figure 7:
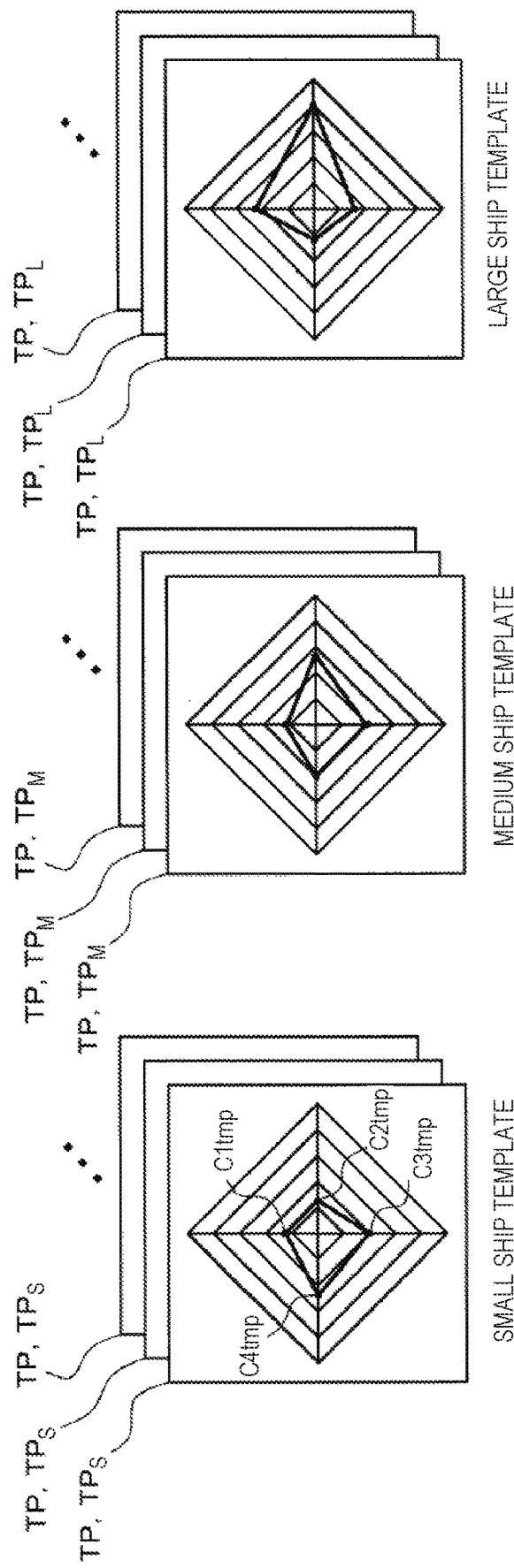
FIG. 7 shows views illustrating templates stored in a memory.

FIG. 7 shows schematic views of templates TP (type-based data) stored in the memory 13. Each template TP may be a graph having the same coordinates as the characteristic vector graph $G_{CV}$ and prepared in advance by experiments etc. For example, the template TP may be a characteristic vector graph generated from the characteristic vector obtained from the reflection waves by conducting an experiment on an object of which shape was already known. The templates TP may include, for example, large ship templates $TP_L$, medium ship templates $TP_M$, and small ship templates $TP_S$ which are for identifying the target object by the identifying module 14 described later in detail. Each template TP may be generated as an identification characteristic vector graph which is compared with the characteristic vector graph $G_{CV}$ to identify the size of the ship corresponding to the target object having the characteristic vector. Note that, the characteristic amounts of each template TP illustrated in FIG. 7 may merely be illustrated as an example and therefore irrelevant to the characteristic amounts obtained by actual experiments etc.

The characteristic vector of the ship may vary depending on the size of the ship. Particularly, for example, a highest value of a partial sample sequence obtained from echoes of a large ship (that is, the characteristic amount C2) may become higher than a highest value of a partial sample sequence obtained from echoes of a small ship. Thus, the size of the target object (ship) may be estimated by preparing, in advance for every size of the ship, the template TP of the characteristic vector which may vary depending on the size of the ship, and comparing the characteristic vector CV of the target object with each template TP stored in the memory 13.

Further, the characteristic vector of the ship may also vary depending on the orientation of a ship (other ship) with respect to the ship, in other words, the orientation of the other ship when seen from the ship. In this regard, the memory 13 may store a plurality of templates TP of the characteristic vectors different from each other depending on the orientation of the ship, for each of the large ship, the medium ship, and the small ship.

The identifying module 14 may compare the characteristic vector graph $G_{CV}$ generated by the characteristic vector generating module 12 with all the templates TP stored in the memory 13 and, based on the comparison result, identify the size of the ship which is the target object (one of the large, medium and small ships). To be slightly specific, the identifying module 14 may calculate similarity between the characteristic vector graph $G_{CV}$ and each template TP, and determine the size of the ship indicated by the template TP having the highest similarity as the size of the ship. The identifying module 14 may identify the sizes of the target objects (ships) corresponding to all the partial sample sequences Rn extracted by the extracting module 11.

For example, the identifying module 14 may calculate, as the similarity, a Euclidean distance between a four-dimensional spatial position defined by the characteristic amounts C1 to C4 constituting the characteristic vector graph $G_{CV}$ of the target object and a four-dimensional spatial position defined by characteristic amounts C1$tmp$ to C4$tmp$ constituting each template. The identifying module 14 may further determine the size indicated by the template which has the smallest Euclidean distance, as the size of the target object. The identification result of the identifying module 14 (whether the target object is the large ship, the medium ship, or the small ship) may be notified to the display image generating module 5.

Figure 8:
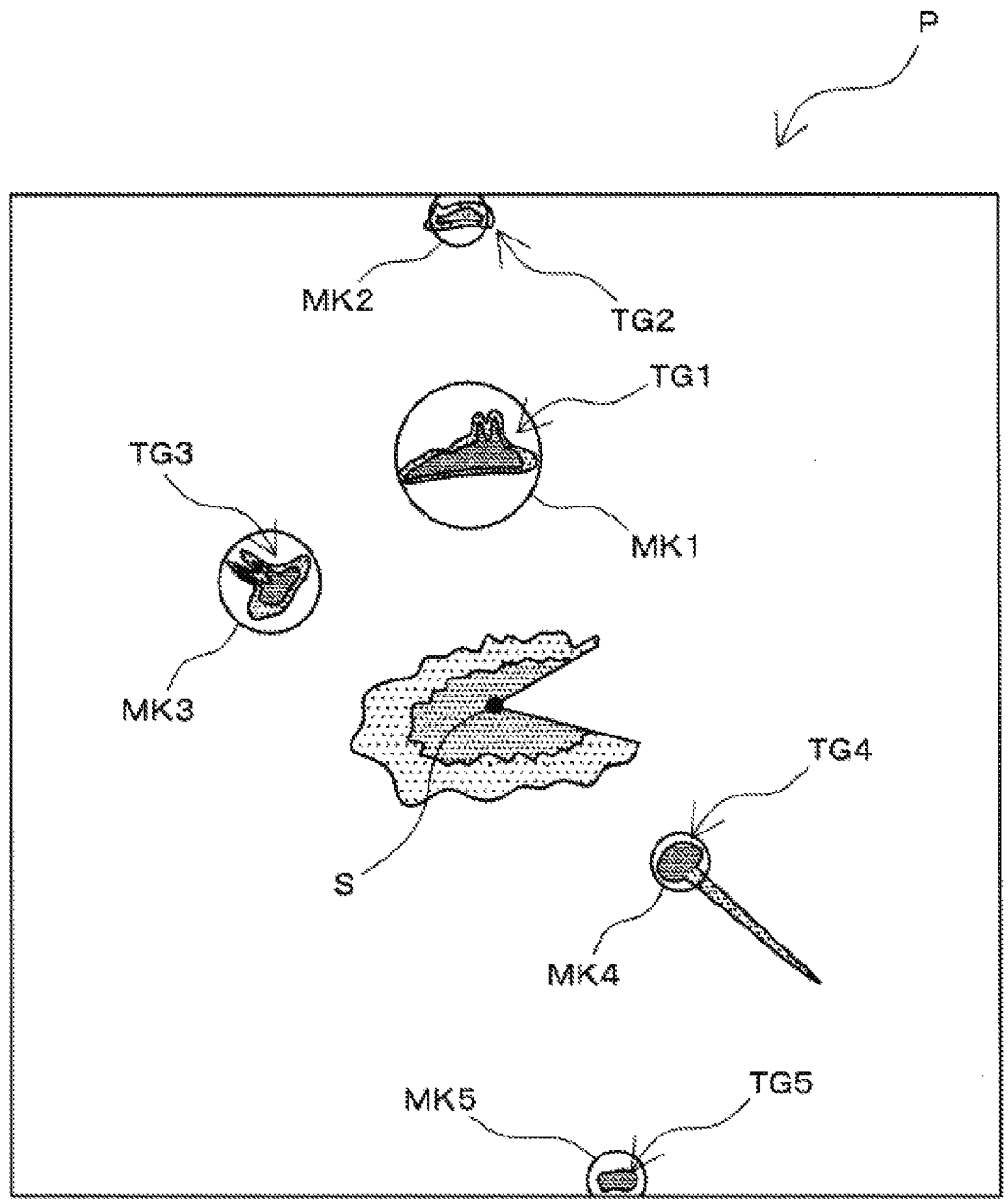
FIG. 8 is a view illustrating one example of a display image generated by a display image generating module illustrated in FIG. 1, which is an image displayed on a display unit.

FIG. 8 is a view illustrating one example of a display image P generated by the display image generating module 5, which is an image displayed on the display unit 6. The display image generating module 5 may generate the display image P displayed on the display unit 6 based on the radar image generated by the radar image generating module 3, the coordinates and estimated velocity vector of the tracked object notified from the tracking processing module 4, and the identification result of the target object obtained by the echo identification processor 10.

For example, based on the coordinates of the tracked object notified from the tracking processing module 4, the display image generating module 5 may generate an image of a marker MKn surrounding the echo image TGn to indicate that the echo image TGn is a tracked object. The size of this marker MKn may be determined based on the identification result of the target object (tracked object) identified by the identifying module 14. In the display image P illustrated in FIG. 8, an echo image TG1 identified as a large ship may be surrounded by a circular marker MK1 having a relatively large radius, an echo image TG3 identified as a medium ship may be surrounded by a circle marker MK3 having a smaller radius than the marker MK1, and echo images TG2, TG4 and TG5 identified as small ships may be surrounded by circular markers MK2, MK4 and MK5 having a smaller radius than the marker MK3. Thus, the user may grasp the size of each ship.

As described above, in the radar apparatus 1 according to this embodiment, the size of the target object may be known based on the size of the marker MKn displayed superimposed on the echo image TGn of each target object.

Further, as described above, the echo identification processor 10 may identify the target object based on the comparison result of the characteristic amounts C1 to C4 generated from the partial sample sequence Rn corresponding to each target object with the templates TP. In this manner, the risk of erroneously identifying the target object may be reduced compared with using the chronological information of the amplitudes of the echo signals as it is as in the conventional case.

To describe this point more in detail, in the conventional case, since the chronological information of the amplitude of the echo signal is used as it is, even when the echo amplitude changes instantaneously (that is, in a relatively short time) due to noises etc., this change may influence the identification of the target object, causing erroneous identification of the target object.

On the other hand, in the radar apparatus of this embodiment, the characteristics of the partial sample sequence Rn obtained for each target object may be calculated as the characteristic amounts C1 to C4, and the target object may be identified based on the characteristic amounts C1 to C4. Thus, it may be prevented that the instantaneous change of the echo amplitude greatly influences the identification result of the target object.

Therefore, according to the echo identification processor 10, the influence of the instantaneous change of the amplitude of the echo signal when identifying the target object may be reduced. Thus, the target object may accurately be identified.

Further, the echo identification processor 10 may identify the target object by using the characteristic vector CV generated from the plurality of characteristic amounts C1 to C4. Thus, characteristics of the target object may be grasped in multiple directions. As a result, the target object may be identified more accurately.

Further, the echo identification processor 10 may calculate the characteristic amount C1 based on the number N1 of samples constituting the rising portion of the partial sample sequence Rn, and identify the target object based on the characteristic amount C1. As a result, the target object may suitably be identified based on the rising portion.

Further, the echo identification processor 10 may calculate the characteristic amount C2 based on the highest value Vp among the amplitudes of the samples included in the partial sample sequence Rn, and identify the target object based on the characteristic amount C2. As a result, the target object may suitably be identified based on the highest value.

Further, the echo identification processor 10 may calculate the characteristic amount C3 based on the number N2 of samples constituting the falling portion of the partial sample sequence Rn, and identify the target object based on the characteristic amount C3. As a result, the target object may suitably be identified based on the falling portion.

Further, the echo identification processor 10 may calculate the characteristic amount C4 based on the value obtained on the basis of the integral value A2 of the falling portion of the partial sample sequence Rn, and identify the target object based on the characteristic amount C4. As a result, the target object may suitably be identified based on the integral value.

Further, the echo identification processor 10 may identify the target object based on the similarity between the characteristic vector graph $G_{CV}$ generated based on the characteristic amounts C1 to C4 and the templates TP. As a result, one of the plurality of templates TP which is closest to the characteristic vector graph $G_{CV}$ may be selected.

Further, the echo identification processor 10 may calculate the similarity based on the difference between the characteristic amounts C1 to C4 of the target object and the characteristic amounts C1*tmp* to C4*tmp* of the templates TP. As a result, the similarity may suitably be calculated.

Although the embodiment of the present disclosure is described above, the present disclosure is not limited to these embodiments, and various modifications may be made without departing from the spirit of the present disclosure.

Figure 9:
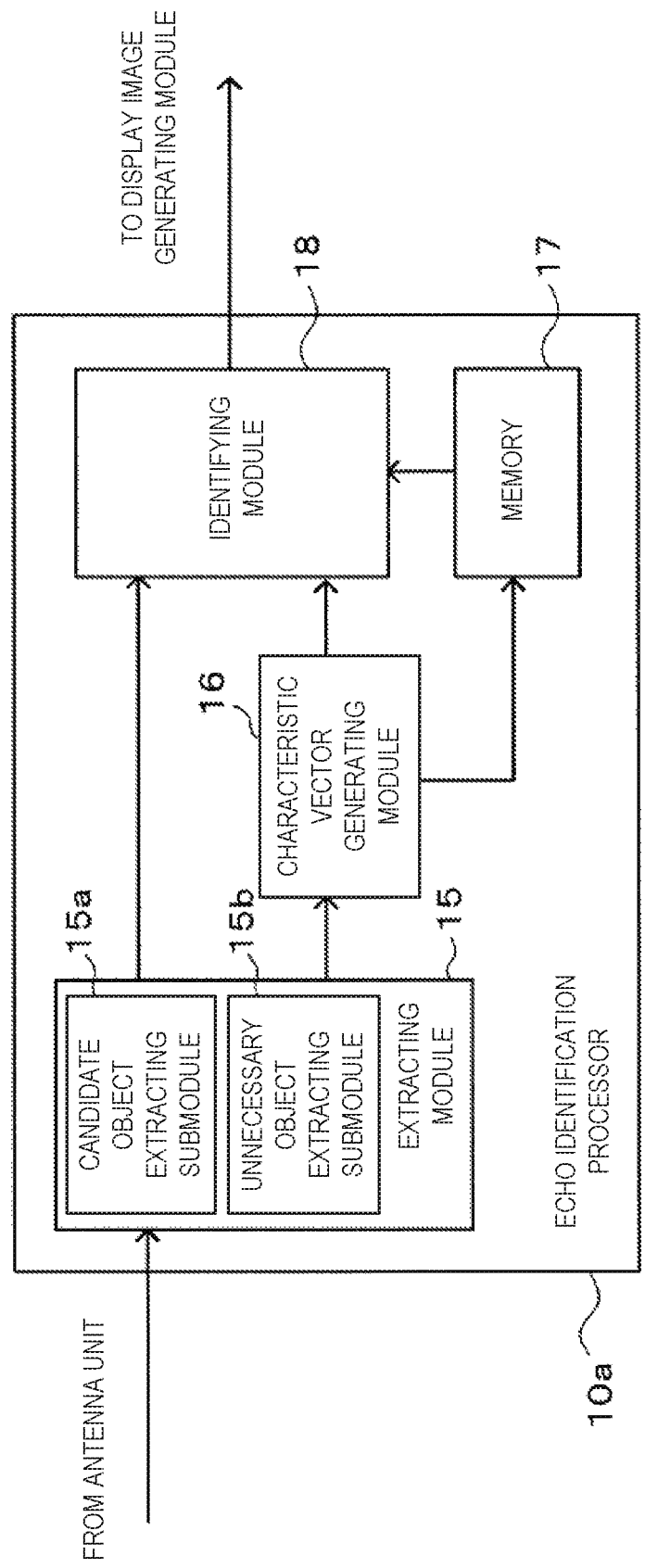
FIG. 9 is a block diagram of an echo identification processor of a radar apparatus according to a modification.
Figure 10:
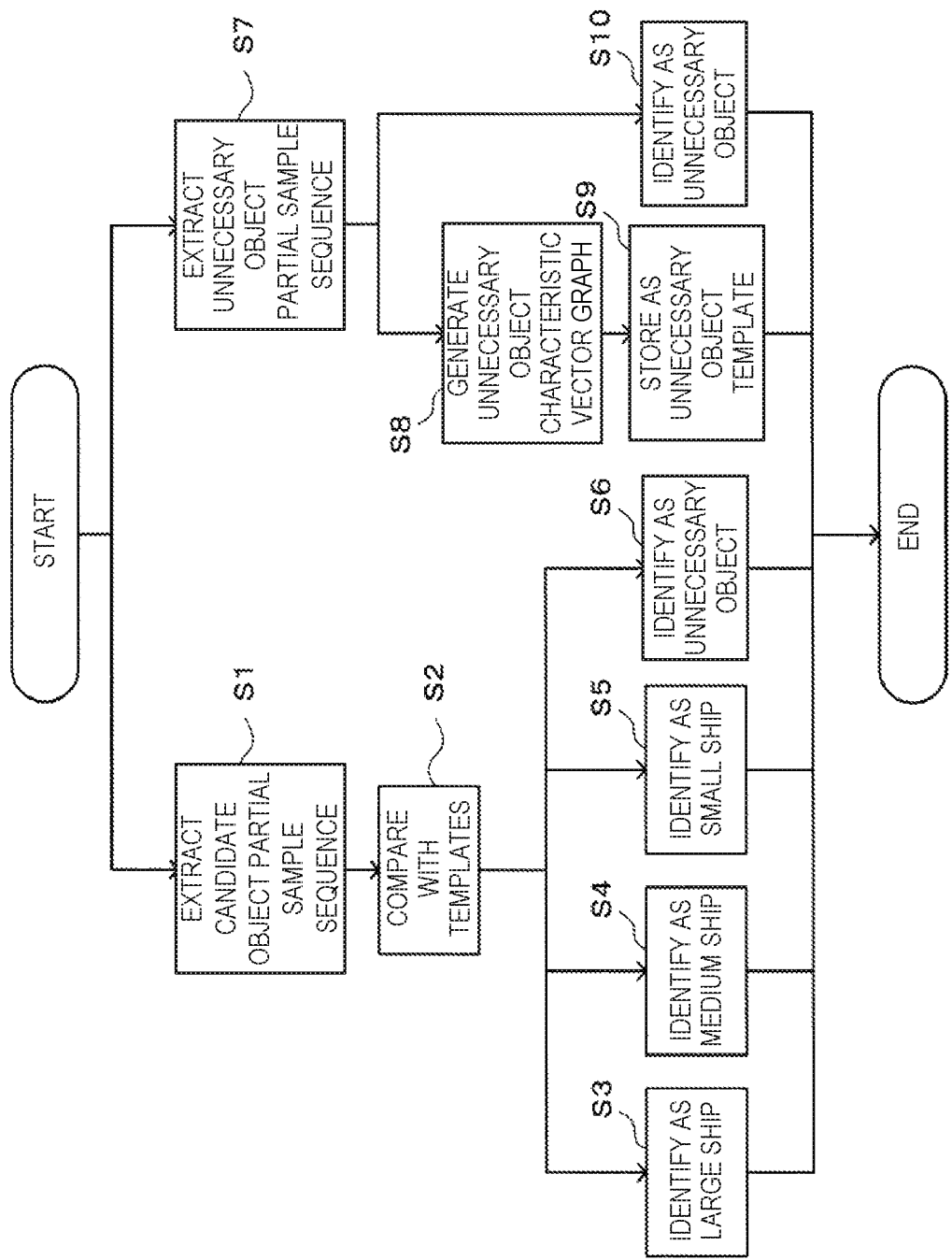
FIG. 10 is a flowchart illustrating an operation of the echo identification processor illustrated in FIG. 9.
Figure 11:
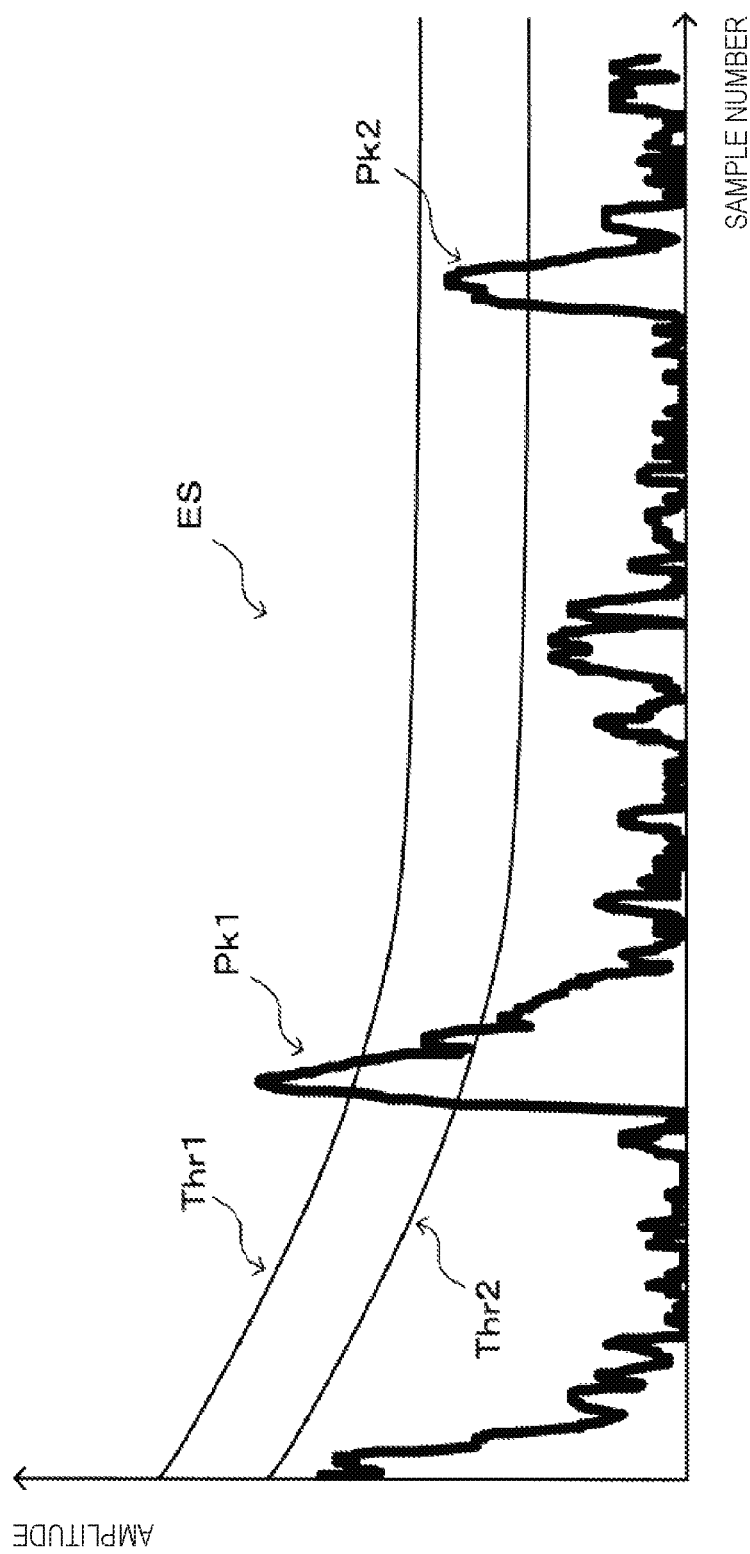
FIG. 11 is a graph illustrating one example of an echo sample sequence.

(1) FIG. 9 is a block diagram of an echo identification processor 10*a* of a radar apparatus according to a modification. Further, FIG. 10 is a flowchart illustrating an operation of the echo identification processor 10*a* illustrated in FIG. 9. Moreover, FIG. 11 is a graph illustrating one example of an echo sample sequence. The echo identification processor 10*a* of the radar apparatus according to this modification may be different from the echo identification processor 10 of the above embodiment in configuration and operation. The echo identification processor 10*a* may include an extracting module 15, a characteristic vector generating module 16, a memory 17, and an identifying module 18. Hereinafter, the configuration and operation of the echo identification processor 10*a* may be described with reference to FIGS. 9 to 11.

The extracting module 15 may include a candidate object extracting submodule 15*a* and an unnecessary object extracting submodule 15*b*.

The candidate object extracting submodule 15*a* may compare, with reference to FIG. 11, each of sample data constituting the echo sample sequence ES with a first threshold Thr1 stored therein (corresponding to the threshold Thr of the above embodiment). If at least a given number of successive sample data exceed the first threshold Thr1 in the distance direction, the candidate object extracting submodule 15*a* may extract these sample data as a candidate object partial sample sequence RAn (51 in FIG. 10). The extracted candidate object partial sample sequence RAn may be outputted to the characteristic vector generating module 16. Note that, the candidate object partial sample sequence RAn may be a partial sample sequence obtained from an object which may be a target object candidate, and, as described later in detail, may be categorized into a partial sample sequence of the target object and a partial sample sequence of an unnecessary object (sea clutter etc.) as an object which is not a target object. Further, the value of the first threshold Thr1 described above may be changed by the operation of the user.

The unnecessary object extracting submodule 15*b* may compare, with reference to FIG. 11, each of sample data constituting the echo sample sequence with the first threshold Thr1 and a second threshold Thr2. If at least a given number of successive sample data fall below the first threshold Thr1 and also exceed the second threshold Thr2 in the distance direction, the unnecessary object extracting submodule 15*b* may extract these sample data as an unnecessary object partial sample sequence (S7 in FIG. 10). Note that, the unnecessary object partial sample sequence may be a partial sample sequence caused by the unnecessary object described above. The extracted unnecessary object partial sample sequence may be outputted to the characteristic vector generating module 16. Further, the object from which the partial sample sequence extracted as the unnecessary object partial sample sequence by the unnecessary object extracting submodule 15*b* is generated, may be notified to the identifying module 18 as the unnecessary object. Further, the value of the second threshold Thr2 described above may be changed by the operation of the user.

Similarly to the case of the above embodiment, the characteristic vector generating module 16 may generate the candidate object characteristic vector graph as a characteristic vector graph based on the candidate object partial sample sequence RAn extracted by the candidate object extracting submodule 15*a*. Further, similarly to the case of the above embodiment, the characteristic vector generating module 16 may generate an unnecessary object characteristic vector graph as a characteristic vector graph based on the unnecessary object partial sample sequence extracted by the unnecessary object extracting submodule 15*b* (S8 in FIG. 10). The candidate object characteristic vector graph may be outputted to the identifying module 18. On the other hand, the unnecessary object characteristic vector graph may be outputted to the memory 17.

Figure 12:
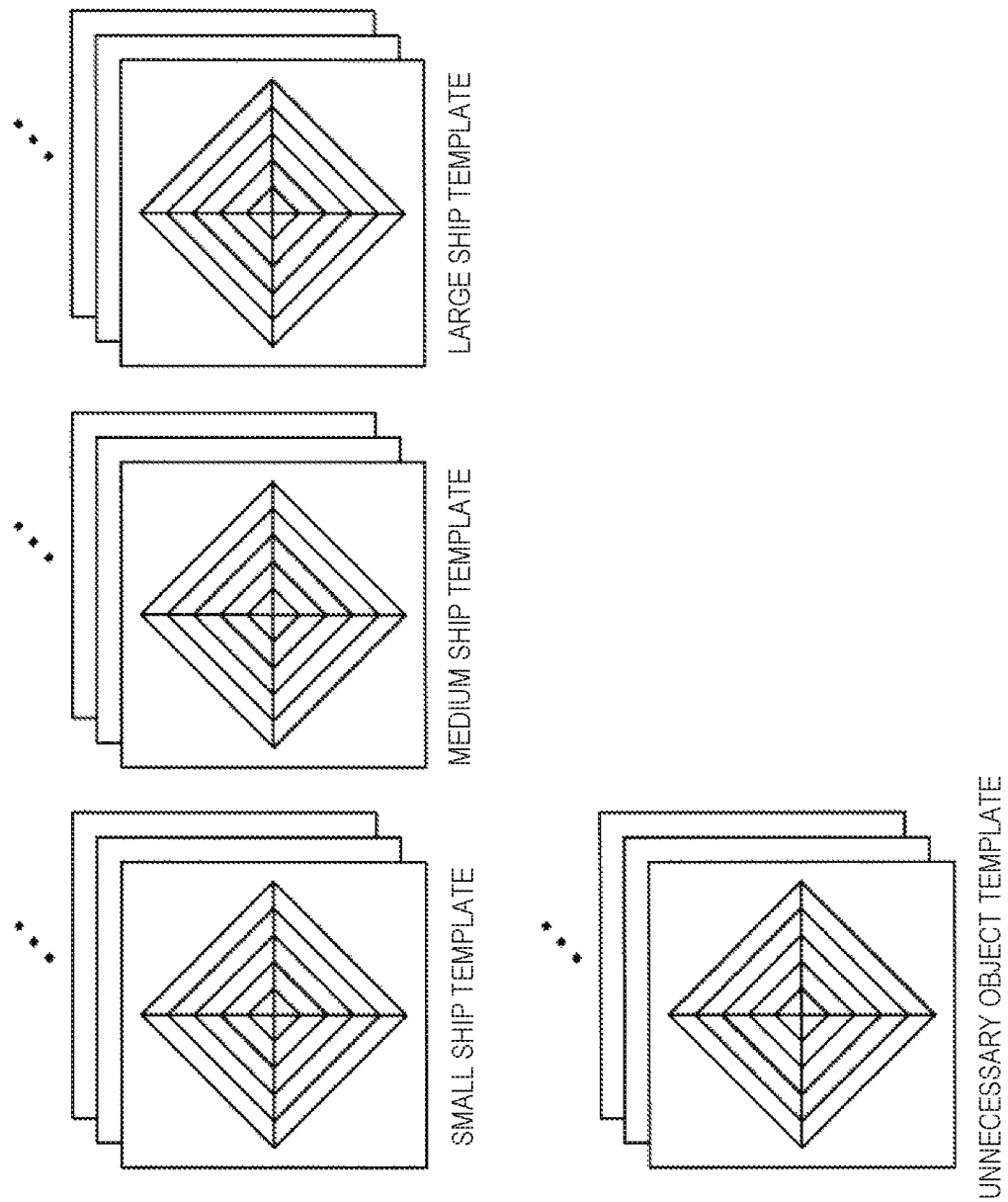
FIG. 12 shows schematic views of templates stored in a memory illustrated in FIG. 9.

FIG. 12 shows schematic views of templates stored in the memory 17 illustrated in FIG. 9. Similarly to the case of the above embodiment, the memory 17 may store large ship templates, medium ship templates, and small ship templates for identifying the target object. These templates may be prepared in advance by experiments etc. similarly to the case of the above embodiment.

Further, the memory 17 may store unnecessary object templates (unnecessary object identification data) for identifying the unnecessary object. The memory 17 may store the unnecessary object characteristic vector graphs generated and outputted sequentially by the characteristic vector generating module 16 as the unnecessary object templates (S9 in FIG. 10). An upper limit number of the unnecessary object characteristic vector graphs stored in the memory 17 may be determined in advance, and when the number of the unnecessary object characteristic vector graphs generated from the characteristic vector generating module 16 exceeds the upper limit number, the oldest unnecessary object template stored may be deleted and the latest unnecessary object characteristic vector graph inputted may be stored as a new unnecessary object template. Note that, the memory 17 may not store any unnecessary object template in an initial state (state immediately after the apparatus is manufactured).

Based on the partial sample sequences extracted by the extracting module 15 (the candidate object partial sample sequence and the unnecessary object partial sample sequence), the identifying module 18 may identify whether the object from which the partial sample sequences are generated is the target object or the unnecessary object. Further, when the partial sample sequence is caused by the target object, the identifying module 18 may identify which ship corresponds to the target object, a large ship, a medium ship or a small ship.

For example, when the unnecessary object partial sample sequence is extracted by the extracting module 15, the object from which the unnecessary object partial sample sequence is generated may be identified as the unnecessary object (that is, it is not identified as the target object (S10 in FIG. 10). On the other hand, when the extracting module 15 extracts the candidate object partial sample sequence, the identifying module 18 may compare the characteristic vector graph generated from the candidate object partial sample sequence with the templates (S2 in FIG. 10), and according to the comparison result, the identifying module 18 may identify the object from which the characteristic vector is generated, as one of the large ship, the medium ship, the small ship, and the unnecessary object (S3 to S6 in FIG. 10).

Meanwhile, the intensity of the echo signal of the object which is desired to be detected by the radar apparatus may vary depending on the surrounding environment etc. In this regard, the radar apparatus of this modification may be configured such that the value of the first threshold Thr1 is adjustable by the user so that the object desired to be detected may be detected. Thus, for example, even in an environment in which the echo intensity of the object desired to be detected is low, the user may reduce the value of the first threshold Thr1 so that the object may be detected. However in this case, an object, such as sea clutter which is not desired to be detected, may erroneously be detected as the target object.

In this regard, in the echo identification processor 10a of the radar apparatus of this modification, the characteristic vector graph obtained from an unnecessary object, such as sea clutter, may be stored in the memory 17 as the unnecessary object template. Further, the characteristic vector graph of a candidate object which is a candidate for the target object may be compared, not only with each ship template, but also with each unnecessary object template. Thus, when the characteristic vector graph of the object detected as the candidate object has the highest similarity to the unnecessary object template, the object may not be detected as the target object. That is, by the user reducing the value of the first threshold, the object which has been erroneously detected once may be excluded from the target objects by considering it as an unnecessary object. Therefore, according to the echo identification processor 10a of this modification, the risk of erroneously detecting the unnecessary object as a target object may be reduced while the detection accuracy of the target object may be improved.

As described above, according to the echo identification processor 10a of the radar apparatus of this modification, the risk of erroneously detecting the unnecessary object as a target object may be reduced.

Figure 13:
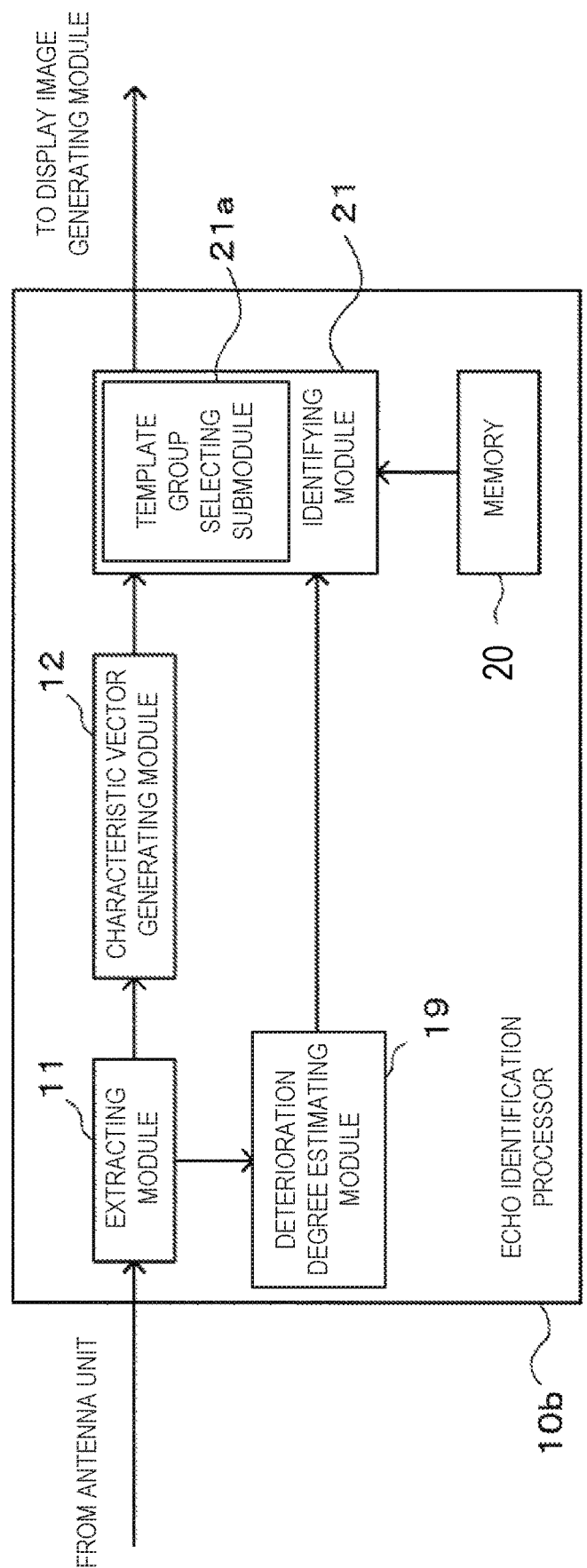
FIG. 13 is a block diagram of an echo identification processor of a radar apparatus according to a modification.

(2) FIG. 13 is a block diagram of an echo identification processor 10b of a radar apparatus according to a modification. The echo identification processor 10b of the radar apparatus according to this modification may include an extracting module 11, a characteristic vector generating module 12, a deterioration degree estimating module 19, a memory 20, and an identifying module 21. Among these components, configurations and operations of the extracting module 11 and the characteristic vector generating module 12 may be the same as those of the extracting module 11 and the characteristic vector generating module 12 of the echo identification processor 10 of the above embodiment and the detailed description thereof is omitted.

The deterioration degree estimating module 19 may estimate a deterioration degree of the partial sample sequence extracted by the extracting module 11. Echoes caused by other objects (rain, sea clutter, etc.) may be superimposed on an echo caused by a target object, which may cause distortion of the echo of the target object desired to be observed. The deterioration degree may be an index indicating the degree of difference of a partial sample sequence actually extracted, from the partial sample sequence corresponding to only the target object. For example, the partial sample sequence having a low deterioration degree may be a partial sample sequence extracted in a situation where the number of the other objects (rain, see clutter, etc.) described above is small. On the other hand, the partial sample sequence having a high deterioration degree may be a partial sample sequence extracted in a situation where the number of the other objects is large.

For example, the deterioration degree estimating module 19 may calculate a difference between a highest value of the partial sample sequence and a threshold Thr as a deterioration degree reference value, and calculate the deterioration degree according to the deterioration degree reference value. The deterioration degree may be classified into, for example, three levels of low, medium and high. The deterioration degree estimating module 19 may estimate that the deterioration degree is low when the deterioration degree reference value is a relatively low value, that the deterioration degree is medium when the deterioration degree reference value is a medium value, and that the deterioration degree is high when the deterioration degree reference value is a relatively high value. The deterioration degree estimated by the deterioration degree estimating module 19 may be notified to the identifying module 21.

Figure 14:
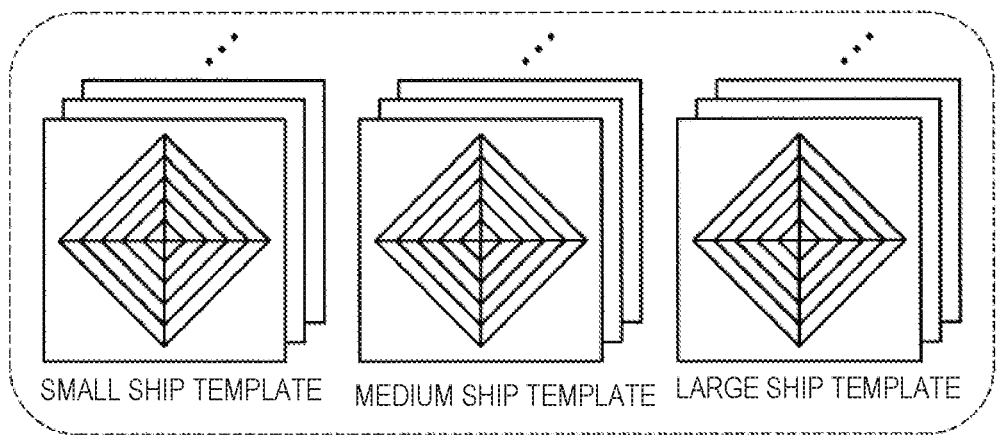
FIG. 14 shows views illustrating templates stored in a memory illustrated in FIG. 13.
Figure 14:
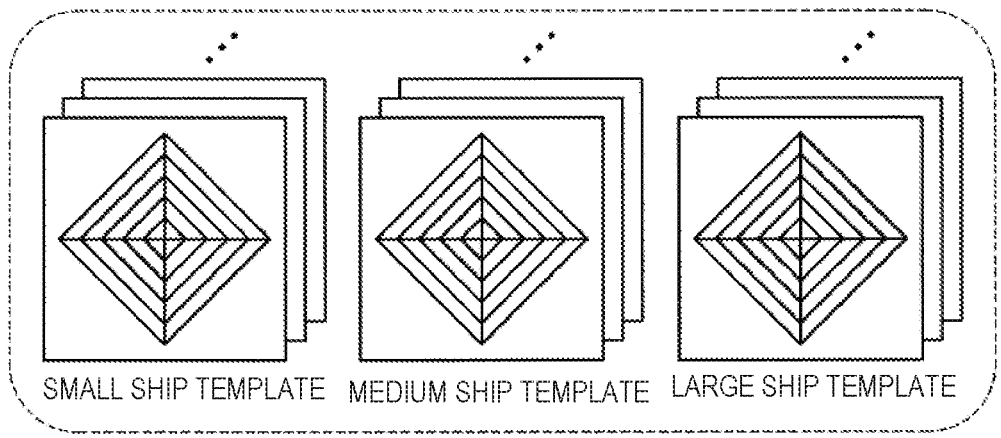
Figure 14:
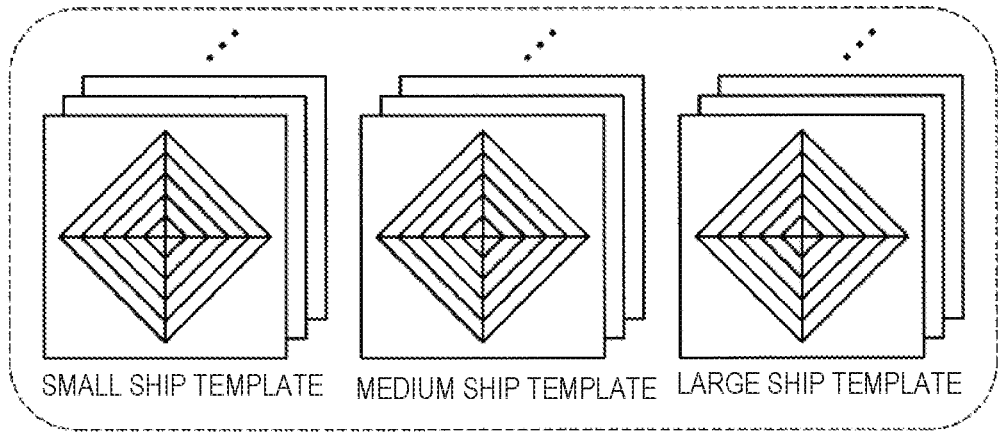

FIG. 14 shows views illustrating templates stored in the memory 20 illustrated in FIG. 13. The templates stored in the memory 20 of this modification may also be prepared in advance by experiments etc., similarly to the templates stored in the memory 13 of the above embodiment. The templates of this modification may be classified and stored for each deterioration degree described above. For example, with reference to FIG. 14, the plurality of templates stored in the memory 20 may be classified into one of a template group (high-deterioration degree template group) classified into a group of high deterioration degree, a template group (medium-deterioration degree template group) classified into a group of medium deterioration degree, and a template group (low-deterioration degree template group) classified into a group of low deterioration degree. Each group of templates may include templates of a large ship, templates of a medium ship, and templates of a small ship.

The identifying module 21 may include a template group selecting submodule 21a (data group selecting module). The template group selecting submodule 21a may select one of the three template groups based on the deterioration degree notified from the deterioration degree estimating module 19. For example, the template group selecting submodule 21a may select the low deterioration degree template group when the deterioration degree notified from the deterioration degree estimating module 19 is low, the medium deterioration degree template group when the deterioration degree notified from the deterioration degree estimating module 19 is medium, and the high deterioration degree template group when the deterioration degree notified from the deterioration degree estimating module 19 is high. Then, the identifying module 21 may compare each of the templates constituting the selected template group with the characteristic vector graph $G_{CV}$ to calculate the similarity, and the identifying module 21 may notify a display image generating module 5 of the size of the ship corresponding to the template with the highest similarity (the large ship, the medium ship, or the small ship), similarly to the case of the above embodiment.

As described above, in the echo identification processor 10b of the radar apparatus of this modification, the partial sample sequence of the target object may be compared with the templates included in a template group prepared for each deterioration degree of the partial sample sequence (type-based data group for each deterioration degree). Thus, even when noises, such as rain or sea clutter etc., are superimposed on the echo of the target object, since the target object may be identified using the template group in which the influence of these noises are taken into consideration in advance, the object may be identified more suitably.

Figure 15:
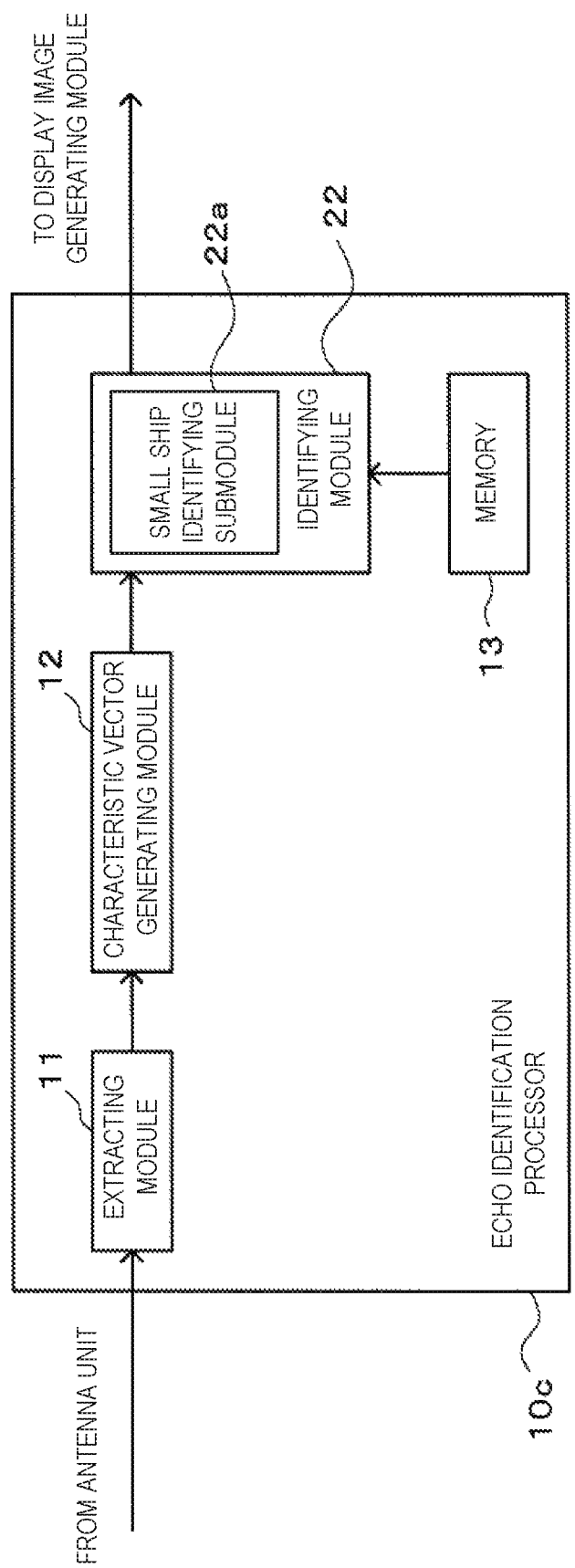
FIG. 15 is a block diagram of an echo identification processor of a radar apparatus according to a modification.
Figure 16:
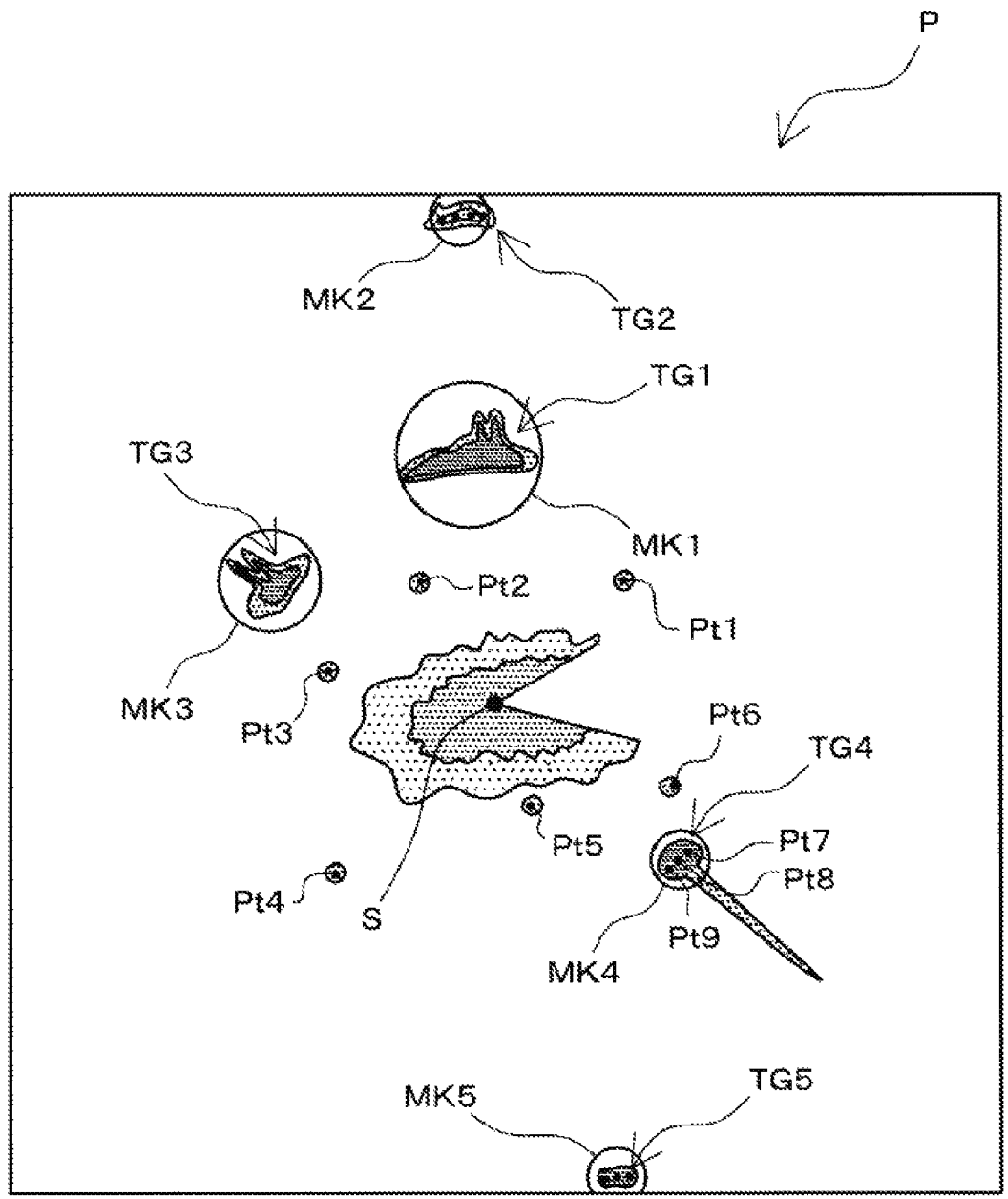
FIG. 16 is a view illustrating one example of an image displayed on a display unit illustrated in FIG. 15.

(3) FIG. 15 is a block diagram of an echo identification processor 10c of a radar apparatus according to a modification. Further, FIG. 16 is a view illustrating one example of an image displayed on a display unit 6 illustrated in FIG. 15. The echo identification processor 10c of the radar apparatus of this modification may include an extracting module 11, a characteristic vector generating module 12, a memory 13, and an identifying module 22. Among these components, the extracting module 11, the characteristic vector generating module 12, and the memory 13 may be the same as those in the above embodiment. Thus, the description thereof is omitted.

As in the case of the above embodiment, the identifying module 22 may be configured to identify the small ship, the medium ship, and the large ship. Among these ships, the identification processes of the medium and large ships may be the same as in the above embodiment. However, the identification process of the small ship may be different from the above embodiment.

The identifying module 22 may include a small ship identifying submodule 22a. The identifying module 22 may extract partial sample sequences with highest similarity to the template of the small ship, as small ship candidate partial sample sequences. For the respective small ship candidate partial sample sequences thus extracted, the small ship identifying submodule 22a may select small ship candidate partial sample sequences at closest positions to each other, and when the mutual distance therebetween is relatively long (above a given value), the small ship candidate partial sample sequences may not be identified as the small ship. On the other hand, when the mutual distance is short (below the given value), the small ship candidate partial sample sequences may be identified as the small ship.

For example, to describe with reference to FIG. 16, the small ship candidate partial sample sequence located at Pt1 may be relatively distant from positions of other small ship candidate partial sample sequences (Pt2 to Pt6). Therefore, the small ship candidate partial sample sequence may not be identified as the small ship, and the small ship marker MKn may not be displayed on the echo image. Similarly, the small ship candidate partial sample sequences of which positions are indicated by Pt2 to Pt6 may also not be identified as the small ship.

On the other hand, to also describe with reference to FIG. 16, the small ship candidate partial sample sequence located at Pt7 may be close to positions (Pt8 and Pt9) of other small ship candidate partial sample sequences. Therefore, the small ship candidate partial sample sequences may be identified as the small ship, and a marker MK4 for the small ship may be displayed on the echo image.

Generally, even with a small object, partial sample sequences caused by the small object may be obtained successively over a plurality of points in the circumferential direction with reference to the ship position S. In other words, the partial sample sequences not obtained successively in the circumferential direction may highly possibly be caused by noise, such as sea clutter, and not by the target object. In this regard, as described above, the small ship candidate partial sample sequences of which mutual distance is short in the circumferential direction may be identified as the small ship, and the small ship candidate partial sample sequence far from the other small ship candidate partial sample sequences may not be identified as the small ship. Thus, the possibility of erroneously identifying the unnecessary echo as the small object may be reduced.

As described above, according to the echo identification processor 10c of the radar apparatus of this modification, the possibility of erroneously identifying the unnecessary echo as the small object may be reduced.

Figure 17:
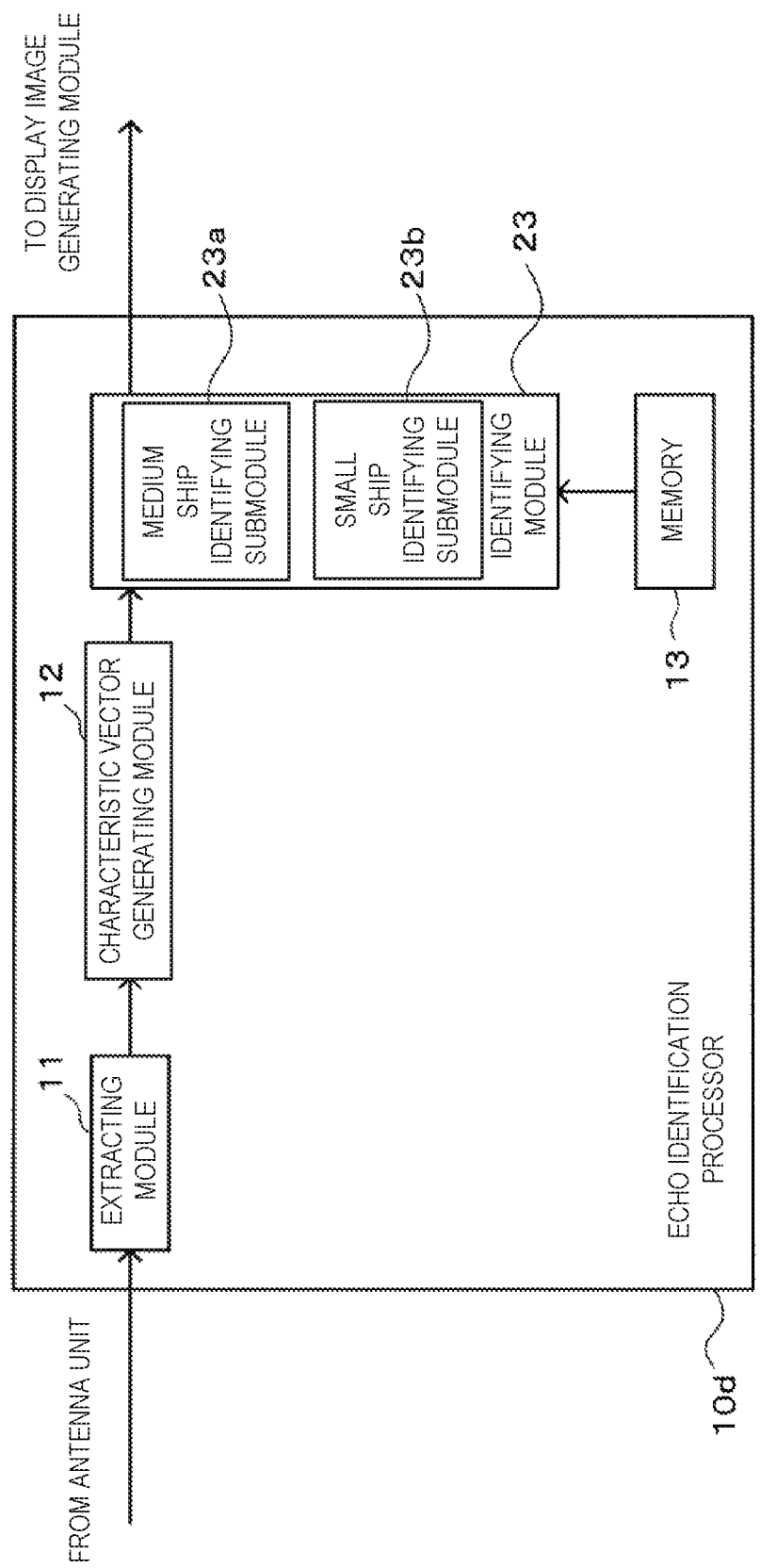
FIG. 17 is a block diagram of an echo identification processor of a radar apparatus according to a modification.

(4) FIG. 17 is a block diagram of an echo identification processor 10d of a radar apparatus according to a modification. The echo identification processor 10d of the radar apparatus of this modification may include an extracting module 11, a characteristic vector generating module 12, a memory 13, and an identifying module 23. Among these components, the extracting module 11, the characteristic vector generating module 12, and the memory 13 may be the same as those in the above embodiment. Thus, the description thereof is omitted.

Similarly to the case of the above embodiment, the identifying module 23 may be configured to identify a small ship, a medium ship, and a large ship. Among these ships, the identification process of the large ship may be the same as in the above embodiment. However, the identification processes of the medium ship and the small ship may be different from the above embodiment.

The identifying module 23 may include a medium ship identifying submodule 23a and a small ship identifying submodule 23b. The identifying module 23 may extract partial sample sequences with highest similarity to a template of the medium ship, as medium ship candidate partial sample sequences. For the respective medium ship candidate partial sample sequences thus extracted, when the large ship is located on the ship side of the medium ship candidate partial sample sequences, the medium ship identifying submodule 23a may not identify the medium ship candidate partial sample sequences as the target object. Note that, each of the medium ship candidate partial sample sequences illustratively described here may correspond to a far-side partial sample sequence. Further, each of the partial sample sequences generated from the large ship, which are illustratively described here, may correspond to a close-side partial sample sequence.

Similarly, the identifying module 23 may extract partial sample sequences with highest similarity to a template of the small ship, as small ship candidate partial sample sequences. For the respective small ship candidate partial sample sequences thus extracted, when a large or medium ship is located on the ship side of the small ship candidate partial sample sequences, the small ship identifying submodule 23b may not identify the small ship candidate partial sample sequences as the target object. Note that, each of the small ship candidate partial sample sequences illustratively described here may correspond to the far-side partial sample sequence. Further, each the partial sample sequences generated from the large and medium ships, which are illustratively described here, may correspond to the close-side partial sample sequence.

Figure 18:
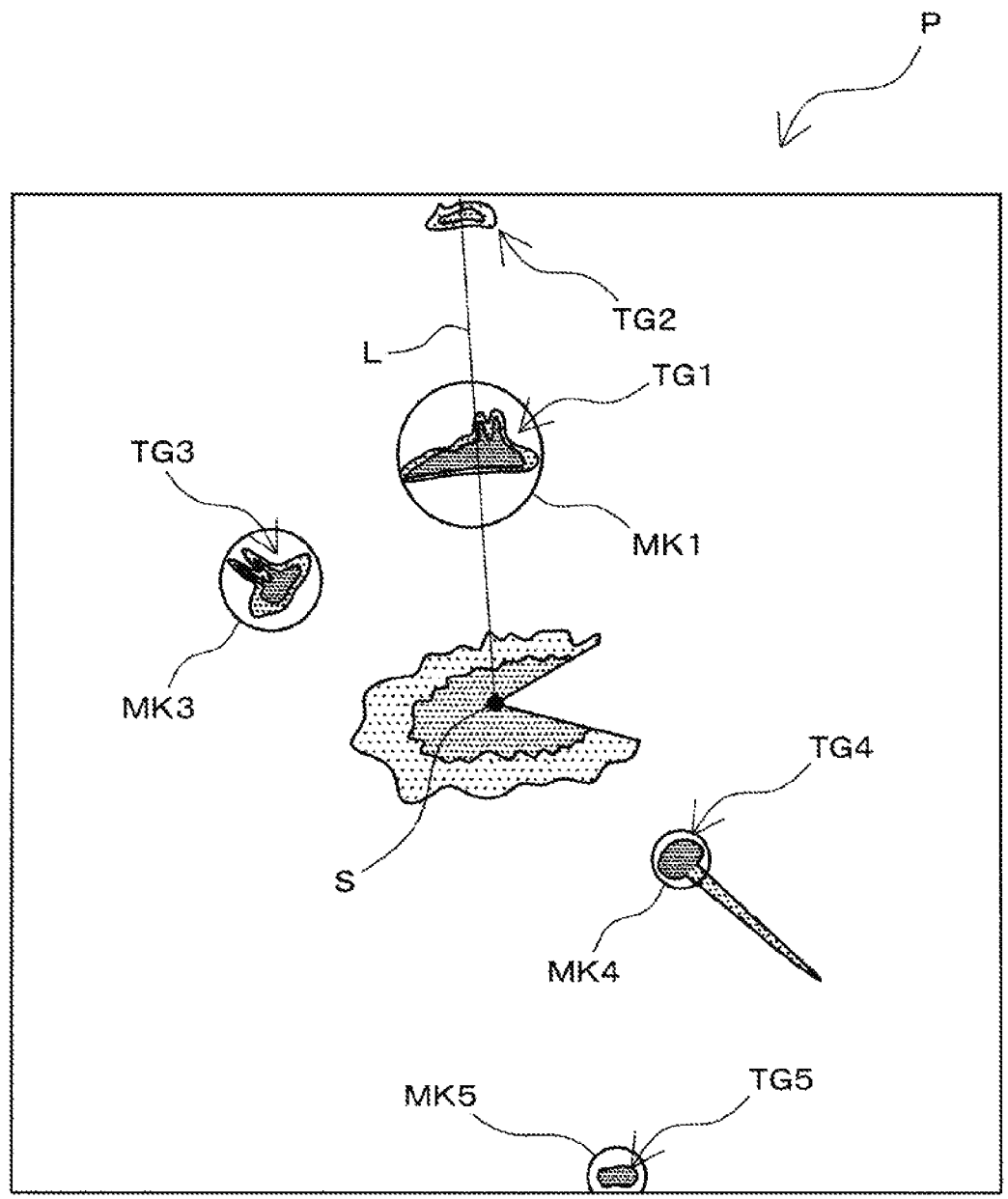
FIG. 18 is a view illustrating one example of an image displayed on a display unit illustrated in FIG. 17.

FIG. 18 is a view illustrating one example of an image displayed on a display unit 6 illustrated in FIG. 17. With reference to FIG. 18, on the ship position S side of an echo image TG2 generated from the small ship candidate partial sample sequences, an echo image TG1 larger than the echo image TG2 may be located in the same azimuth direction (straight line L direction) with reference to the ship position S. Therefore, markers MK1, MK3 to MK5 as assigned to other echo images TG1, TG3 to TG5 may not be assigned to the echo image TG2.

Meanwhile, as illustrated in FIG. 18, when a relatively large object (corresponding to TG1) is detected close to the ship and an object (corresponding to TG2) smaller than the large object may be detected on the far side at the same azimuth, the small object may highly possibly be an echo caused by multiple reflections of the transmission wave. This is because, when a large object is located close to the ship, it may be considered that the transmission wave does not reach the object located farther than the large object at the same azimuth. In this regard, when the size of the object on the far side from the ship at the same azimuth is smaller than the size of the object on the close side to the ship, the small object may not be detected as the target object as in the echo identification processor 10d of this modification. Thus, it may be prevented that a false image caused by multiple reflections is erroneously identified as the target object.

As described above, the echo identification processor 10d of the radar apparatus of this modification may prevent erroneous identification of the false image caused by multiple reflections as the target object.

Figure 19:
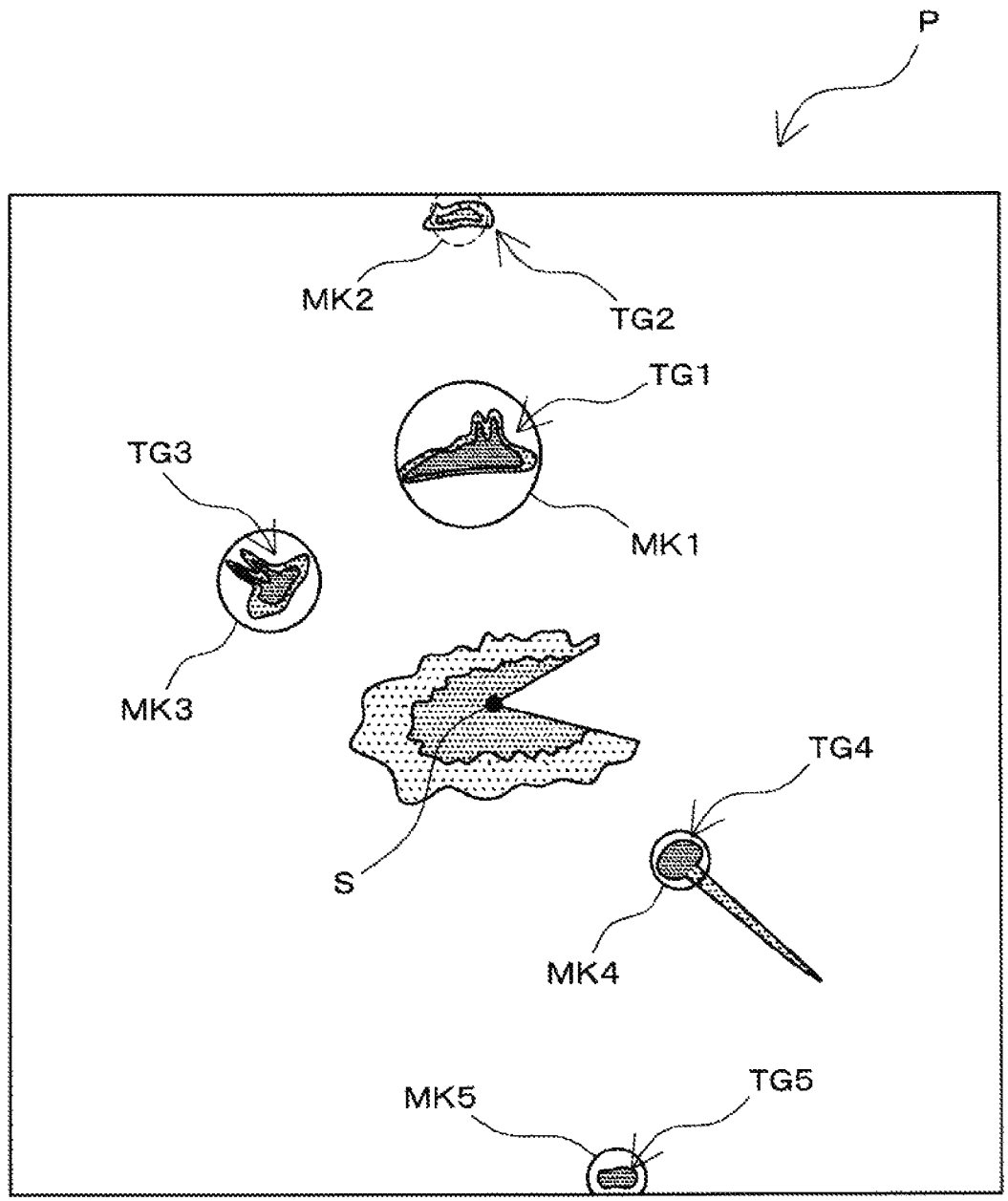
FIG. 19 is a view illustrating one example of the image displayed on the display unit illustrated in FIG. 17, illustrating a different display example from FIG. 18.

Note that, with reference to FIG. 19, in the radar apparatus of this modification, in order to facilitate the understanding that the echo image TG2 estimated to be the false image is caused by multiple reflections, for example, the echo image TG2 may be surrounded by a marker MK2 indicated by a dashed line as illustrated in FIG. 19. Thus, the user may estimate that the echo image TG2 is the false image.

Figure 20:
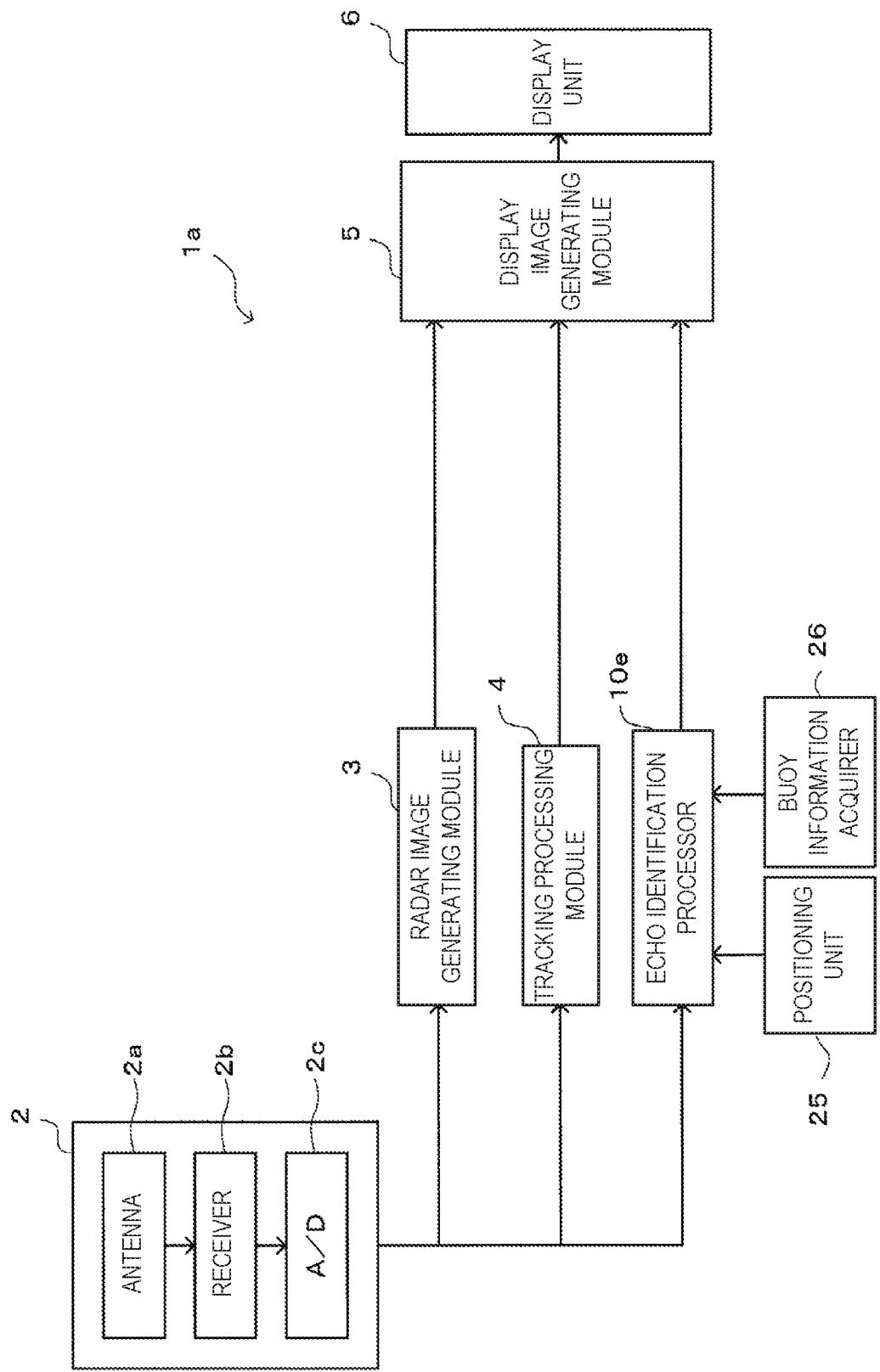
FIG. 20 is a block diagram of a radar apparatus according to a modification.
Figure 21:
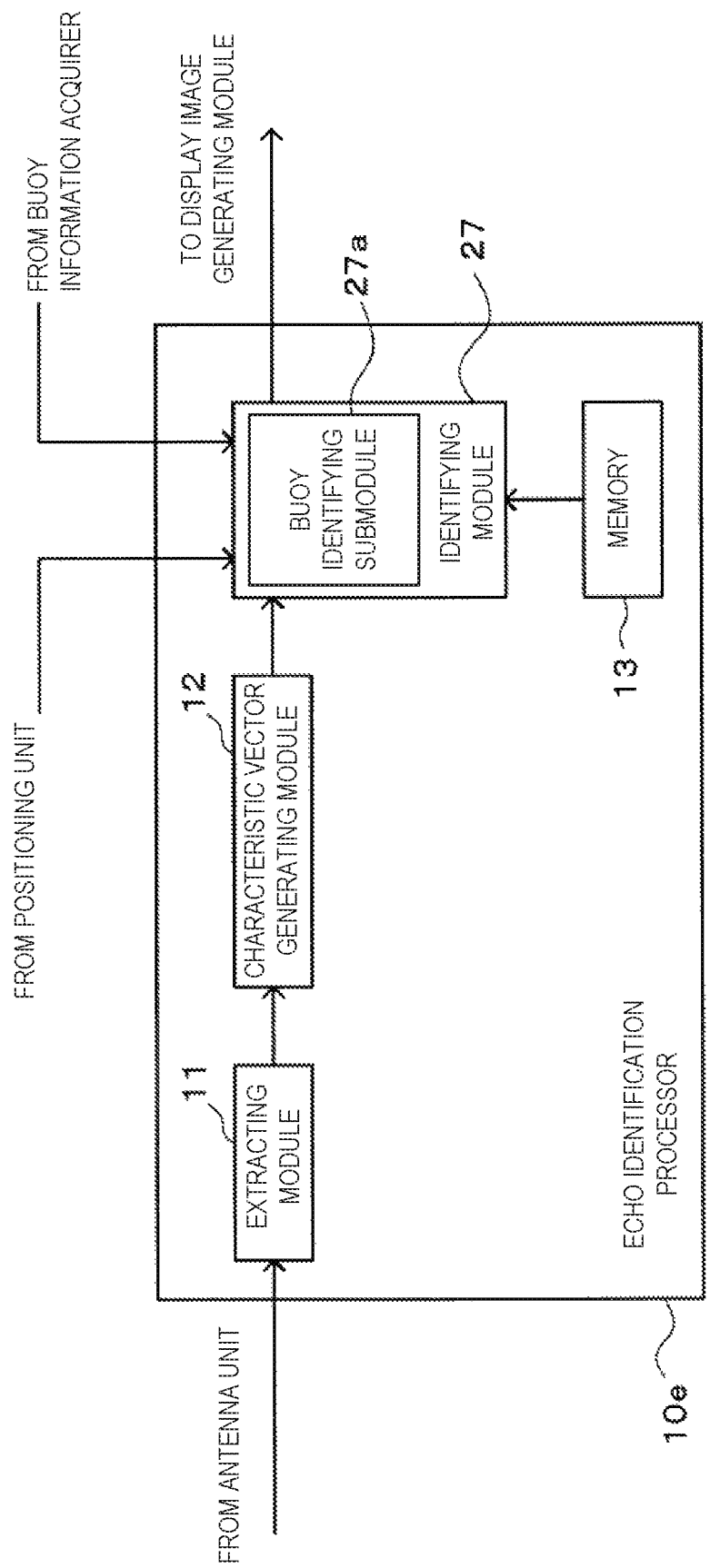
FIG. 21 is a block diagram of an echo identification processor illustrated in FIG. 20.

(5) FIG. 20 is a block diagram of a radar apparatus 1a according to a modification. Further, FIG. 21 is a block diagram of an echo identification processor 10e illustrated in FIG. 20. As illustrated in FIG. 20, the radar apparatus 1a of this modification may include a positioning unit 25 and a buoy information acquirer 26 in addition to the respective components provided to the radar apparatus 1 of the above embodiment. Further, the echo identification processor 10e may include a buoy identifying submodule 27a in addition to the respective components provided to the echo identification processor 10 of the above embodiment. The buoy identifying submodule 27a may be included in an identifying module 27.

The positioning unit 25 may be configured by a positioning device, such as a GPS receiver. The positioning unit 25 may acquire a ship position and heading at a time point when the radar apparatus of this modification acquires a sweep signal.

The buoy information acquirer 26 may store chart information (nautical chart information) including positions of buoys in a marine area where the ship travels. The buoy information acquirer 26 may acquire positional information of buoys within a given distance range from the ship, among the buoys included in the chart information.

The buoy identifying submodule 27a may identify buoys from the target objects identified as small ships by the identifying module 27. For example, the buoy identifying submodule 27a may compare the position of each target object identified as the small ship by the identifying module 27 with the positional information of each buoy acquired by the buoy information acquirer 26, to calculate a distance therebetween. Further, when the distance is short (within a given range), the buoy identifying submodule 27a may identify that the target object identified as the small ship is the buoy. On a display unit 6, an echo image of the object identified as the buoy may be assigned with, for example, a symbol indicating that the echo image is caused by the buoy.

As described above, the echo identification processor 10e of the radar apparatus of this modification may identify whether the target object is the buoy.

(6) In the above embodiment, the characteristic vector graph $G_{CV}$ may be created and the characteristic vector graph $G_{CV}$ and the template TP may be compared with each other; however, without limiting to this, the characteristic vector CV which is the basis of the characteristic vector graph $G_{CV}$ may be compared with the template TP.

(7) In the above embodiment, the characteristic vector CV may be created from the plurality of characteristic amounts C1 to C4, and the characteristic vector graph $G_{CV}$ obtained from the characteristic vector CV and the template TP may be compared with each other; however, it may not be limited to this. For example, the characteristic amounts calculated from the partial sample sequence may be compared with the characteristic amounts constituting the template.

(8) In the above embodiment, the above characteristic amounts C1 to C4 may be calculated as the characteristic amounts; however, other characteristic amounts may be used. For example, the characteristic amounts may be a ratio between an average value and a peak value in the rising portion of the echo sample sequence, or a ratio between an average value and a peak value in the falling portion of the echo sample sequence, etc.

DESCRIPTION OF REFERENCE CHARACTERS

1, 1a Radar Apparatus
2a Antenna (Transducer)

10, 10a-10e Echo Identification Processor (Signal Processor)
11, 15 Extracting Module
12, 16 Characteristic Vector Generating Module (Characteristic Amount Calculating Module)

The invention claimed is:

1. A signal processor for detecting a target object by using a transducer configured to transmit a transmission wave and receive a reflection wave of the transmission wave, based on a reception signal obtained from the reflection wave, the signal processor comprising:
processing circuitry configured
to extract, from echo sample sequences each of which is obtained by plotting a plurality of samples constituting the reception signal on coordinates defined by a distance from the transducer and amplitudes of the plurality of samples and is generated for each azimuth with reference to a position of the transducer, a plurality of samples caused by the target object as a partial sample sequence; and
to calculate a characteristic of the partial sample sequence as a characteristic amount; and
a memory configured to store a plurality of type-based data that are data as comparison targets of the characteristic amount and correspond to types from which the target object is identified;
the processing circuitry being further configured
to compare the characteristic amount with each of the plurality of type-based data; and
to identify the type of the target object for which the characteristic amount is calculated based on the comparison result,
wherein the characteristic amount is one of
a number of samples constituting a rising portion of the partial sample sequence,
a number of samples constituting a falling portion of the partial sample sequence, and
a value obtained based on an integral value of the falling portion.

2. The signal processor of claim 1, wherein the processing circuitry calculates a plurality of the characteristic amount and generates a characteristic vector from the plurality of the characteristic amount.

3. The signal processor of claim 1, wherein the processing circuitry identifies the target object based on similarity between the characteristic amount and the type-based data.

4. The signal processor of claim 3, wherein the similarity is calculated based on a difference between the characteristic amount and the type-based data.

5. The signal processor of claim 1, wherein the type corresponds to the size of the target object.

6. The signal processor of claim 1, wherein the processing circuitry is further configured
to estimate a deterioration degree that is a degree of deterioration of the partial sample sequence, the memory storing the plurality of type-based data classified for each deterioration degree, as type-based data groups for each deterioration degree; and
to select, based on the deterioration degree, a type-based data group for each deterioration degree to be compared with the partial sample sequence of which the deterioration degree is estimated,
wherein the processing circuitry compares the characteristic amount with each of the plurality of type-based data constituting the type-based data group for each deterioration degree.

7. An echo identification apparatus, comprising:
a transducer configured to transmit a transmission wave and receive a reflection wave of the transmission wave;
processing circuitry configured
to detect a target object by using the transducer, based on a reception signal obtained from the reflection wave;
to extract, from echo sample sequences each of which is obtained by plotting a plurality of samples constituting the reception signal on coordinates defined by a distance from the transducer and amplitudes of the plurality of samples and is generated for each azimuth with reference to a position of the transducer, a plurality of samples caused by the target object as a partial sample sequence; and
to calculate a characteristic of the partial sample sequence as a characteristic amount; and
a memory configured to store a plurality of type-based data that are data as comparison targets of the characteristic amount and correspond to types from which the target object is identified;
the processing circuitry being further configured
to compare the characteristic amount with each of the plurality of type-based data; and
to identify the type of the target object for which the characteristic amount is calculated based on the comparison result,
wherein the characteristic amount is one of
a number of samples constituting a rising portion of the partial sample sequence,
a number of samples constituting a falling portion of the partial sample sequence, and
a value obtained based on an integral value of the falling portion.

8. The echo identification apparatus of claim 7, wherein the processing circuitry calculates a plurality of the characteristic amount and generates a characteristic vector from the plurality of the characteristic amount.

9. The echo identification apparatus of claim 7, wherein the processing circuitry identifies the target object based on similarity between the characteristic amount and the type-based data.

10. The echo identification apparatus of claim 9, wherein the similarity is calculated based on a difference between the characteristic amount and the type-based data.

11. The echo identification apparatus of claim 7, wherein the processing circuitry is further configured
to estimate a deterioration degree that is a degree of deterioration of the partial sample sequence, the memory storing the plurality of type-based data classified for each deterioration degree, as type-based data groups for each deterioration degree; and
to select, based on the deterioration degree, a type-based data group for each deterioration degree to be compared with the partial sample sequence of which the deterioration degree is estimated,
wherein the processing circuitry compares the characteristic amount with each of the plurality of type-based data constituting the type-based data group for each deterioration degree.

12. The echo identification apparatus of claim 7, equipped on a ship, wherein the processing circuitry is further configured
to perform positioning of the ship; and
to acquire nautical chart information including positions of buoys; and
positional information of a buoy within a given distance range from the ship among the buoys in the nautical chart information, wherein the processing circuitry identifies that the target object is the buoy based on the positional information of the buoy and positional information of the target object for which the partial sample sequence is generated.

13. A signal processor for detecting a target object by using a transducer configured to transmit a transmission wave and receive a reflection wave of the transmission wave, based on a reception signal obtained from the reflection wave, the signal processor comprising:
processing circuitry configured
to extract, from echo sample sequences each of which is obtained by plotting a plurality of samples constituting the reception signal on coordinates defined by a distance from the transducer and amplitudes of the plurality of samples and is generated for each azimuth with reference to a position of the transducer, a plurality of samples caused by the target object as a partial sample sequence; and
to calculate a characteristic of the partial sample sequence as a characteristic amount; and
a memory configured to store a plurality of type-based data that are data as comparison targets of the characteristic amount and correspond to types from which the target object is identified;
the processing circuitry being further configured
to compare the characteristic amount with each of the plurality of type-based data;
to identify the type of the target object for which the characteristic amount is calculated based on the comparison result,
to estimate a deterioration degree that is a degree of deterioration of the partial sample sequence, the memory storing the plurality of type-based data classified for each deterioration degree, as type-based data groups for each deterioration degree, and
to select, based on the deterioration degree, a type-based data group for each deterioration degree to be compared with the partial sample sequence of which the deterioration degree is estimated,
wherein the processing circuitry compares the characteristic amount with each of the plurality of type-based data constituting the type-based data group for each deterioration degree.

* * * * *